(12) United States Patent
Fan et al.

(10) Patent No.: US 10,544,669 B2
(45) Date of Patent: Jan. 28, 2020

(54) SURFACE RANGING TECHNIQUE WITH A SURFACE DETECTOR

(71) Applicant: Halliburton Energy Services, Inc, Houston, TX (US)

(72) Inventors: Yijing Fan, Singapore (SG); Burkay Donderici, Houston, TX (US); Joseph Burke, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 214 days.

(21) Appl. No.: 15/119,262

(22) PCT Filed: Sep. 24, 2014

(86) PCT No.: PCT/US2014/057265
§ 371 (c)(1),
(2) Date: Aug. 16, 2016

(87) PCT Pub. No.: WO2016/048307
PCT Pub. Date: Mar. 31, 2016

(65) Prior Publication Data

US 2017/0009566 A1    Jan. 12, 2017

(51) Int. Cl.
*E21B 47/022* (2012.01)
*E21B 47/024* (2006.01)
*E21B 7/04* (2006.01)
*G01V 3/38* (2006.01)
*G01S 19/13* (2010.01)
(Continued)

(52) U.S. Cl.
CPC .......... *E21B 47/02216* (2013.01); *E21B 7/04* (2013.01); *E21B 47/024* (2013.01); *G01S 19/13* (2013.01); *G01V 3/26* (2013.01); *G01V 3/38* (2013.01); *E21B 43/2406* (2013.01)

(58) Field of Classification Search
CPC ................. E21B 7/04; E21B 47/02216; E21B 47/02224; E21B 47/024
See application file for complete search history.

(56) References Cited

U.S. PATENT DOCUMENTS 5,305,212 A    4/1994    Kuckes
5,589,775 A    12/1996    Kuckes
(Continued)

FOREIGN PATENT DOCUMENTS

WO    WO 2014/089402 A2    6/2014

OTHER PUBLICATIONS

International Search Report and the Written Opinion of the International Search Authority, or the Declaration, dated Jun. 8, 2015, PCT/US2014/057265, 15 pages, ISA/KR.
(Continued)

*Primary Examiner* — Giovanna C Wright
*Assistant Examiner* — Yanick A Akaragwe
(74) *Attorney, Agent, or Firm* — Haynes and Boone, LLP

(57) ABSTRACT

A system for electromagnetic wellbore surface ranging to determine the location of a second wellbore relative to a first wellbore utilizing i) a current source configured to directly inject electrical current into a conductive member disposed in each wellbore and ii) an electromagnetic senor positioned on the surface of a formation, the sensor configured to measure electromagnetic fields at the formation surface emanating from the conductive member within each wellbore.

22 Claims, 11 Drawing Sheets

(51) Int. Cl.
  *G01V 3/26*    (2006.01)
  *E21B 43/24*   (2006.01)

(56) References Cited

U.S. PATENT DOCUMENTS

| | | | | |
|---|---|---|---|---|
| 5,923,170 | A * | 7/1999 | Kuckes | E21B 47/02216 |
| | | | | 175/45 |
| 6,035,951 | A * | 3/2000 | Mercer | E21B 47/02216 |
| | | | | 175/45 |
| 6,626,252 | B1 | 9/2003 | Kuckes | |
| 2002/0130663 | A1 | 9/2002 | Kuckes et al. | |
| 2003/0038634 | A1 * | 2/2003 | Strack | G01V 11/00 |
| | | | | 324/323 |
| 2007/0278008 | A1 | 12/2007 | Kuckes et al. | |
| 2008/0106973 | A1 | 5/2008 | Maisons | |
| 2009/0024326 | A1 | 1/2009 | Young et al. | |
| 2009/0178850 | A1 * | 7/2009 | Waters | E21B 7/04 |
| | | | | 175/45 |
| 2011/0298462 | A1 * | 12/2011 | Clark | E21B 47/024 |
| | | | | 324/346 |
| 2013/0141103 | A1 | 6/2013 | Roshtal et al. | |
| 2013/0176137 | A1 | 7/2013 | Kolpack et al. | |
| 2016/0273339 | A1 * | 9/2016 | Wu | G01V 3/26 |
| 2017/0152729 | A1 * | 6/2017 | Gleitman | E21B 41/0092 |

OTHER PUBLICATIONS

Office Action issued for Canadian Patent Application No. 2,955,346, dated Dec. 28, 2017, 4 pages.

\* cited by examiner

SURFACE RANGING TECHNIQUE WITH A SURFACE DETECTOR

PRIORITY

The present application is a U.S. National Stage patent application of International Patent Application No. PCT/US2014/057265, filed on Sep. 24, 2014, the benefit of which is claimed and the disclosure of which is incorporated herein by reference in its entirety.

FIELD OF THE DISCLOSURE

The disclosure relates to wellbore drilling operations, and more particularly to methods and systems for drilling multiple wellbores relative to one another. Most particularly, the disclosure relates to methods and systems for determining the location of a reference wellbore relative to a wellbore being drilled using magnetic ranging employing a magnetic sensor disposed at the surface of a formation.

BACKGROUND OF THE DISCLOSURE

As easy-to-access and easy-to-produce hydrocarbon resources are depleted, there is an increased demand for more advanced recovery procedures. One such procedure is steam assisted gravity drainage (SAGD), a procedure that utilizes steam in conjunction with two spaced apart wellbores. Specifically, SAGD addresses the mobility problem of heavy oil in a formation through the injection of high pressure, high temperature steam into the formation. This high pressure, high temperature steam reduces the viscosity of the heavy oil in order to enhance extraction. The injection of steam into the formation occurs from a first wellbore (injector) that is drilled above and parallel to a second wellbore (producer). As the viscosity of the heavy oil in the formation around the first wellbore is reduced, the heavy oil drains into the lower second wellbore, from which the oil is extracted. Other advanced recovery procedures include thermal Assisted Gravity Drainage (TAGD), Toe to Heal Air Injection (THAI), Vaporized Hydrocarbon Solvent (VAPEX) production and Fire Flooding. In all of these advanced recovery procedures, the precise placement of two or more wellbores relative to one another is an important aspect of the process.

More specifically, the two wellbores are typically drilled at a fixed distance of only a few meters from one another. The placement of the injector wellbore needs to be achieved with very small margin in distance. If the injector wellbore is positioned too close to the producer wellbore, the producing wellbore would be exposed to direct communication of steam at very high pressure and temperature. If the injector wellbore is positioned too far from the producer wellbore, the efficiency of the particular advanced recovery process may be reduced. In order to assist in ensuring that the second wellbore is drilled and positioned as desired relative to the first wellbore, a survey of the two wellbores in the formation is often conducted. These surveying techniques are traditionally referred to as "ranging". Based on ranging, the trajectory of the second wellbore, i.e., the wellbore being drilled, can be altered to ensure the fixed distance between the wellbores is maintained.

One common ranging technique employs electromagnetic (EM) systems and methods to determine direction and distance between two wellbores and ensure a desired distance between the wellbores is maintained. In typical EM ranging systems, an elongated, conductive pipe string, such as the wellbore casing, is disposed in one of the wellbores. This wellbore is often referred to as the "target" wellbore and usually represents the producer wellbore. In any event, a current is applied to this conductive pipe string in the target wellbore by a low-frequency current source. The current flows along the conductive pipe string and results in EM fields around the target wellbore. These EM fields around the target wellbore are measured using an electromagnetic field sensor system disposed in the other wellbore, which is typically the wellbore in the process of being drilled. This second wellbore usually represents the producer wellbore and the EM ranging device in the second wellbore is utilized to directly sense and measure the magnetic field from the target wellbore. The measured magnetic field can then be utilized to determine distance, direction and angle between two wellbores (a well pair), and if necessary, alter the trajectory of the wellbore being drilled. Ranging systems in which a current is injected into or gathered on the target wellbore in order to create or induce a magnetic field around the target wellbore are referred to as "active" ranging systems.

In some large scale drilling applications, a large number of wellbore pairs in close proximity to one another may extend in a formation, either drilled from individual drilling platforms or from a mother wellbore. In order to maximize production from the wellbore pairs and to avoid collision between wellbores, it is important to maintain the multiple wellbore pairs at a desired spacing from each other. Hence ranging techniques are not only needed between two wellbores of a particular system, but also needed between wellbore pairs, such as the injector wellbores between two adjacent wellbore pairs.

DETAILED DESCRIPTION

Figure 1:
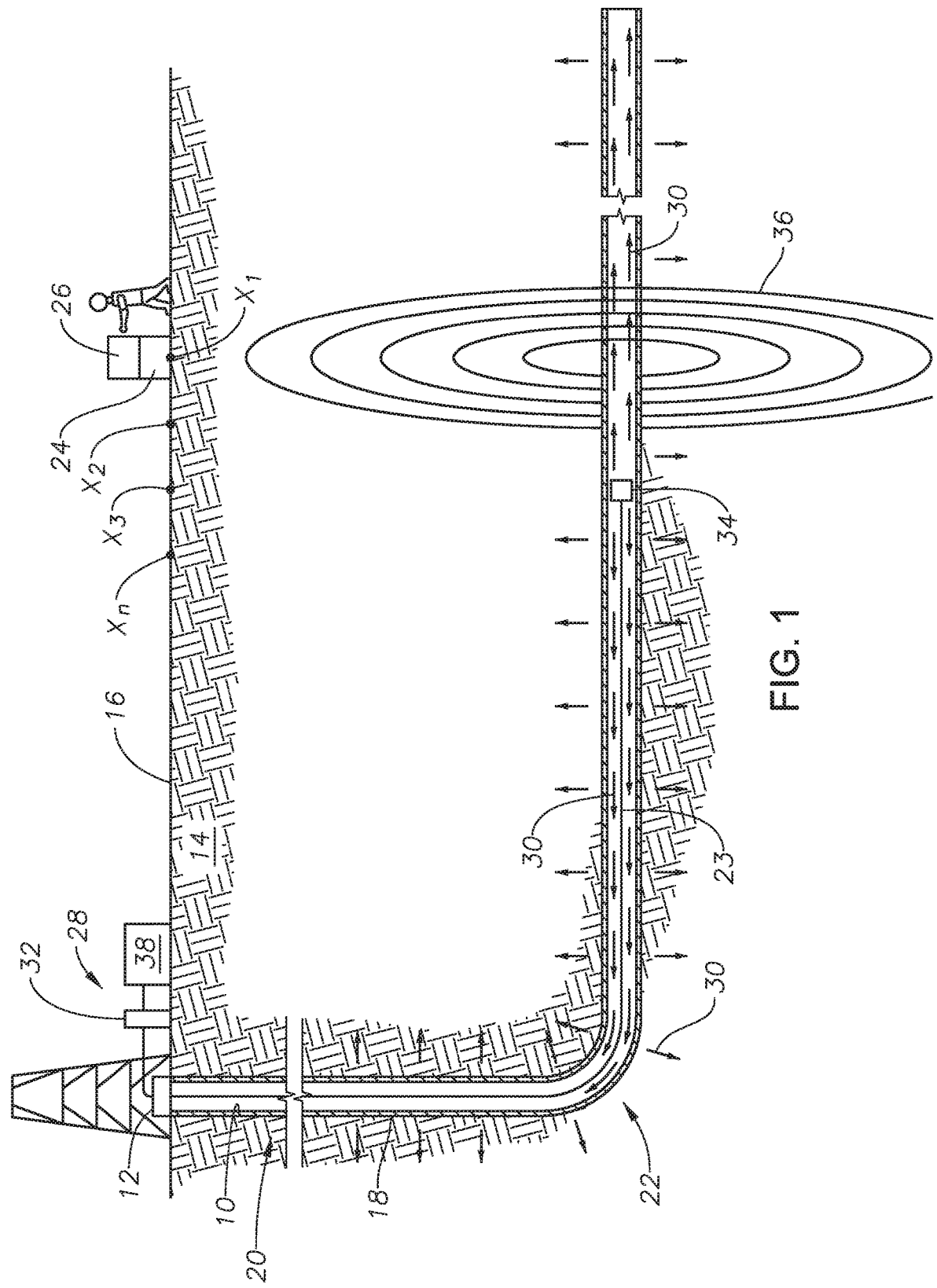
FIG. 1 illustrates a wellbore placement system employing an EM sensor positioned at the formation surface to detect a cased wellbore.

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Optimized placement of two or more wellbores or wellbore pairs for operations such as SAGD can be achieved by an electromagnetic (EM) surface ranging method and system that generates an EM field in a wellbore and utilizes magnetic field measurements made at the surface of a formation in conjunction with information related to the surface location where the magnetic field measurements are made. In particular, EM surface ranging can be utilized to insure that a second wellbore is spaced apart a desired distance from a first wellbore or that a wellbore (such as the producer wellbore) of a wellbore pair is spaced apart a desired distance from a wellbore of another wellbore pair. The wellbore under investigation and from which the EM field is generated can be excited from the surface or from within the target wellbore.

Referring initially to FIG. 1, a first wellbore 10 extends from a wellhead installation 12 into a formation 14 from the surface 16 of the formation 14. The first wellbore may extend directly from the surface or extend as a branch from a parent wellbore. Disposed within wellbore 10 along at least a portion of its length is an elongated conductive member 18 which may be generally oriented within wellbore 10 to be axially aligned therewith. Wellbore 10 may be cased or uncased. To the extent wellbore 10 is cased, in one or more embodiments, conductive member 18 may be a wellbore casing or liner disposed within wellbore 10. For either cased or uncased wellbores, in one or more embodiments, conductive member 18 may be a pipe string, tool string, drillstring, tubing, electrical wire or other conductive body disposed in first wellbore 10. In any event, as described in more detail below, conductive member 18 can provide a path for current flow along a length of first wellbore 10, and any conduction path that serves this purpose can be used. Moreover, conductive member 18 may be generally disposed within wellbore 10 to radiate a magnetic field 36 radially outward from wellbore 10 towards the surface 16 of formation 14.

In one or more embodiments, first wellbore 10 may include a vertical section 20 and a directional or lateral section 22. The directional section 22 is drilled from the vertical section 20 along a desired azimuthal path and a desired inclination path. In one or more embodiments, the vertical section is a "mother" wellbore, and multiple directional sections 22 may extend therefrom, otherwise called mutlilaterals. For purposes of the disclosure, unless otherwise noted, general use of the term "wellbore" may refer to either a single wellbore or a wellbore pair or multilateral wellbores.

Deployed at the surface 16 of the formation 14 is an electromagnetic ("EM") sensor 24 and a position or location system 26. In one or more embodiments, the EM sensor 24 can measure at least one component of a magnetic field or the gradient of a magnetic field to yield magnetic field data. In one or more embodiments, the EM sensor 24 can measure at least one component of an electric field or the gradient of an electric field to yield magnetic field data. In one or more embodiments, EM sensor 24 includes at least a magnetic sensor such as a magnetometer, a magnetic gradient sensor such as may be formed by two spaced apart magnetometers or magnetic gradiometer (receiver). In this regard, where two spaced apart EM sensors 24 each comprising a magnetometer may be used to measure a magnetic gradient.

Likewise, in one or more embodiments, position or location system 26 may comprise of one or more of a global positioning system ("GPS") receiver, accelerometer (single or multi-axis), magnetometer, (single or multi-axis), theodolite, compass, or, any kind of optical or physical system that can be used to measure the surface position or location of the EM sensor 24 on surface 16 and generate surface location data that can be associated with the magnetic field data for the particular location. In one or more embodiments, all EM sensor 24 locations may be determined relative to the well head 12. System 26 is utilized in association with EM sensor 24 to provide a specific surface position for each set of magnetic field data collected using EM sensor 24. System 26 may be either an absolute position sensor or a relative one (displacement sensor). Likewise, position system 26 may be linear, angular, or multi-axis. The disclosure is not limited to a particular type of location or position system 26 so long as the system 26 can be utilized to identify points on the formation surface at which magnetic field data is collected using the surface positioned EM sensor 24. In one or more embodiments, the location system 26 comprises a surface position or location measurement device, such as a GPS receiver, for each EM sensor 24. Thus, in embodiments where a plurality of EM sensors 24 are deployed, the location system 26 may include a plurality of corresponding position or location measurement devices.

In one or more embodiments, EM sensor 24 and location system 26 may be coupled together to form an integrated, single unit that maybe readily transported or carried by an individual at the surface. In this regard, the integrated unit may be a hand-held unit.

A current injection system 28 is provided for driving current 30 to conductive member 18 of first wellbore 10. In one or more embodiments, current injection system 28 includes a current source 32 and one or more electrodes 34 electrically connected to the current source 32. Current source 32 may include a voltage controlled or current controlled transmitter, and in some embodiments, alternates as very low frequencies in the order of 0.02-250 Hz to generate the current. Individual components of the current injection system 28 may be deployed in first wellbore 10, in a second wellbore 38 (see FIG. 2 and as discussed below), at the surface 16 or in another location, as desired, to drive a current 30 via direct electrical contact down a wellbore and along conductive member 18 deployed within the wellbore.

In one or more embodiments, the current injection system 28 is in direct electrical contact with the elongated conductive member via an electrode 34 electrically connected to conductive member 18 or electrically connected to a wellhead installation 12 at the top of first wellbore 10, to permit a current to be injected directly into a conductive member 18 deployed in the wellbore (as opposed to indirect injection by propagating a current through formation 14 to a conductive member in a wellbore). As used herein, direct current injection and direct electrical contact refers to an electrical connection between the current injection system 28 and the conductive member 18 via direct electric conduction, and may include other conductive components therebetween, such as wellheads, blowout preventers, hangers, sleeves and the like so long as they form a direct electrical path between the current injection system 28 and the conductive member 18.

Current injection system 28 is thus disposed to generate magnetic fields 36 about the conductive member 18 which magnetic fields 36 can be measured by EM sensor 24 deployed at surface 16. In one or more embodiments, EM sensor 24 is mobile, permitting EM sensor 24 to be moved so as to measure magnetic fields at a plurality of surface locations $X_1, X_2, X_3 \ldots X_n$ along surface 16. Moreover, location system 26 permits each surface location X to be specifically identified and associated with a particular set of magnetic field data acquired at a particular location. In other embodiments, at least two, and preferably a plurality of, EM sensors 24, either alone or each in combination with a location system 26, may be disposed on the surface 16 in a spaced apart, fixed configuration. In some embodiments, the plurality of spaced apart EM sensors 24 form a two-dimensional surface array on surface 16. It will be appreciated that while a mobile EM sensor 24 is functional to statically determine the location of a wellbore 10 in formation 14, an array may be particularly useful for dynamic drilling of a wellbore (such as wellbore 38 discussed below) in a formation.

Figure 2:
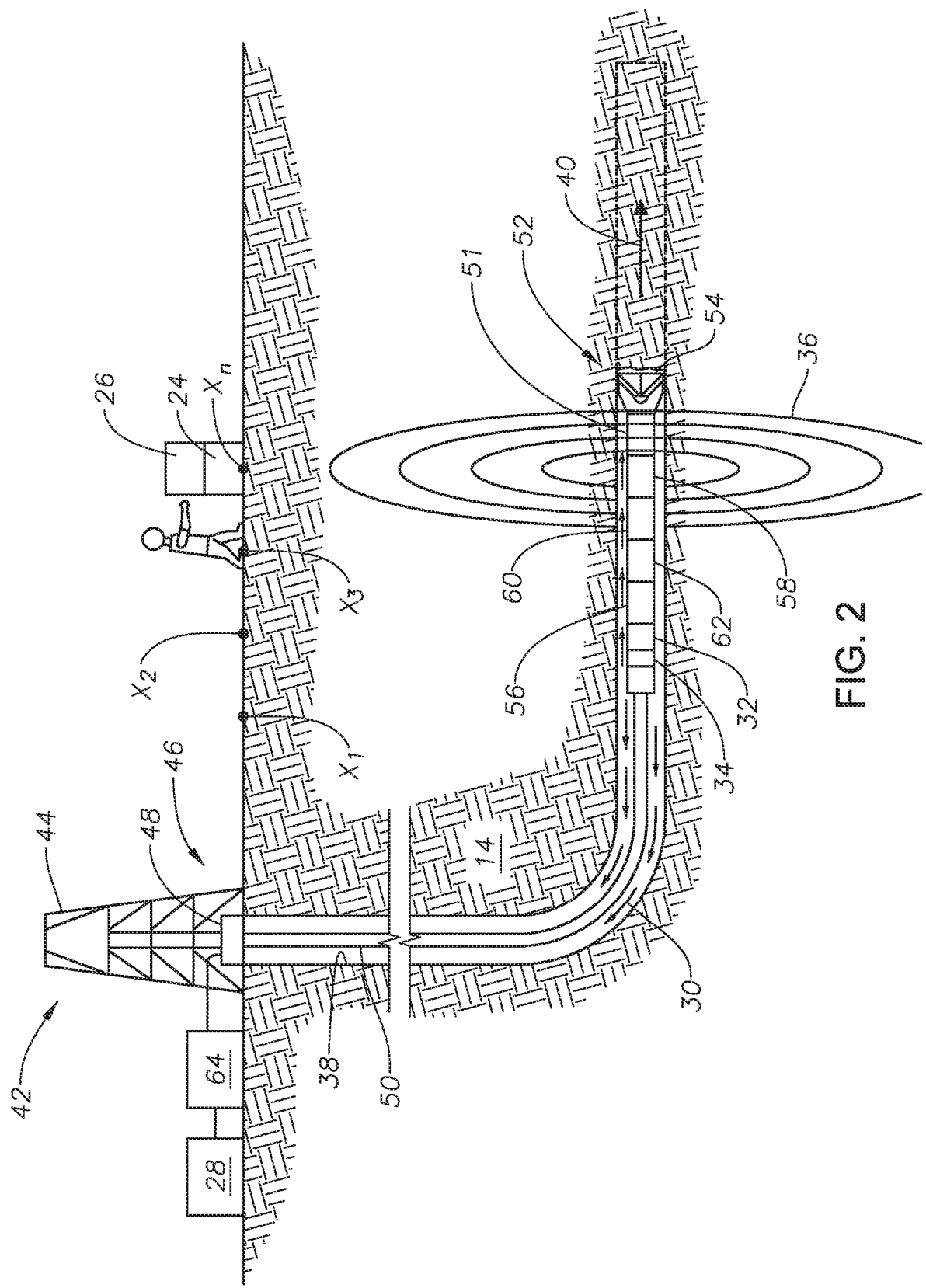
FIG. 2 illustrates a wellbore placement system employing an EM sensor positioned at the formation surface to guide a wellbore being drilled.

With reference to FIG. 2 and ongoing reference to FIG. 1, there is shown a second wellbore 38 in the process of being drilled along a desired path 40. A drilling system 42 is generally shown associated with second wellbore 38, although a similar drilling system 42 may be utilized with first wellbore 10 as well. Drilling system 42 may include a drilling platform 44 positioned over formation 14, and a wellhead installation 46, which may include blowout preventers 48. Platform 44 may be disposed for raising and lowering a conveyance mechanism 50 within second wellbore 38. Conveyance mechanism 50 may be tubing, a pipe string such as a drillstring, a cable, such as a wireline, slickline or the like or some other conveyance system, depending on the operation being conducted within second wellbore 38. All or a portion of conveyance mechanism 50 be form an elongated conductive member.

To the extent drilling system 42 is being utilized to actively drill second wellbore 38, conveyance mechanism 50 may carry a bottom-hole-assembly (BHA) 52. BHA 52 includes a drill bit 54 to extend the second wellbore 38 along desired path 40. In one or more embodiments, BHA 52 may include any one or more of a power module 56, such as a mud motor, a steering module 58, a control module 60, and other sensors and instrumentation modules 62. As will be appreciated by persons of skill in the art, the BHA 52 illustrated in FIG. 2 may be a measurement-while-drilling or logging-while-drilling system in which EM surface ranging as described herein can be utilized to guide drill bit 54 during drilling of second wellbore 38.

In the case where the power module 56 is a mud motor, it is driven by drilling fluid flow, and in turn, drives the drill bit 54. Power module 56 may also provide power to the current injection system 28 in some embodiments.

Steering module 58 enables the wellbore 38 to be extended in a desired direction. Many suitable steering mechanisms are well known, e.g., steering vanes, "bent sub" assemblies, and rotary steerable systems. The steering mechanism configuration can be set and adjusted by commands from a control system 64 at the surface, such as a logging truck or other control skid. Alternatively, control module 60 can be programmed with a desired route, and it can adjust the steering mechanism as needed to direct the wellbore along the desired path.

In the forgoing embodiments, conveyance mechanism 50 and/or BHA 52 function as a conductive member, such as conductive member 18 of FIG. 1, to conduct a current 30 from which magnetic fields 36 result. In these embodiments, the current 30 is generated by a current injection system similar to current injection system 28. Although the disclosure is not limited to a particular configuration of the current injection system for the embodiments of FIG. 2, in one or more preferred embodiments, BHA 52 includes the current source 32 and one or more electrodes 34 electrically connected to the current source 32. In other embodiments, the current injection system may be located on the surface such as shown in FIG. 1 and a current 30 can be transmitted down conveyance mechanism 50. In this regard, the current injection system for the first wellbore 10 and the second wellbore 38 may be the same current injection system, or alternatively, a first current injection system may be used in association with first wellbore 10 and a second current injection system, such as carried on conveyance mechanism 50 or otherwise incorporated in the BHA 52, may be used in association with the second wellbore 38. In either case, the current is directly injected by the current injection system into the respective elongated conductive member to yield magnetic fields 36.

Regardless of the configuration, current injection system is disposed to generate magnetic fields 36 about the BHA 52 and/or conveyance mechanism 50. As illustrated in FIG. 2, EM sensor 24 can be utilized to measure the magnetic at a plurality of surface locations $X_1, X_2, X_3 \ldots X_n$ along surface 16 and generate magnetic field data for each surface location X. Moreover, location system 26 permits each surface location X to be specifically identified and associated with a particular set of magnetic field data acquired at a surface location. In one or more embodiments, at least two and preferably a plurality of EM sensors 24, either alone or each in combination with a position system 26, may be disposed on the surface 16 in a spaced apart configuration. In some embodiments, the plurality of spaced apart EM sensors 24 form a surface array on surface 16 (see FIG. 7).

In one or more embodiments in which a BHA 52 is utilized to drill a wellbore 38, the current injection system used to generate magnetic fields 36 can be replaced with another type of magnetic field generator, such as solenoids or rotating magnets carried by BHA 52.

Additionally, while the system and method of the invention are not limited to a particular magnetic field measurement, in one preferred embodiment, either the absolute magnetic field or the gradient is measured at the surface, while in another embodiment, both are measured at the surface. Distance and direction to the target wellbore, and hence, position of the target wellbore in the formation (as well the position relative to other wellbores) can be calculated by analyzing the magnetic field data resulting from measured magnetic fields as described in more detail below. The current injection system is configured to directly drive a current in relation to a target wellbore so as to generate a magnetic field therefrom for detection and measurement at the surface.

A control system 64 may also be deployed to control drilling system 30. On one or more embodiments, control system 64 is configured to control drilling system 42, and in particular, steering module 58, utilizing magnetic fields measured by EM sensor 24 at one or more surface locations. In one or more embodiments where a plurality of EM sensors 24 are disposed in an array at known surface locations X, magnetic fields 36 can be continually or intermittently generated and control system 64 can make on-the-fly corrections to the drilling system 42 as drilling operations are in progress in order to adjust the trajectory of a wellbore being drilled.

While the current injection system 28, EM sensor 24 and position system 26 as described herein are illustrated with respect to land-based drilling systems, the disclosure also includes use with offshore and marine drilling system unless specifically described otherwise.

In one or more embodiments, current injection system 28, surface EM sensor 24 and location system 26 may be used in drilling deviated relief wells or intersecting deviated wells, such as when it is desirable to establish direct fluid communication between two wells. This may be particularly useful in wellbore intervention operations, for example, where a relief wellbore may intersect a deviated wellbore laterally.

Figure 3:
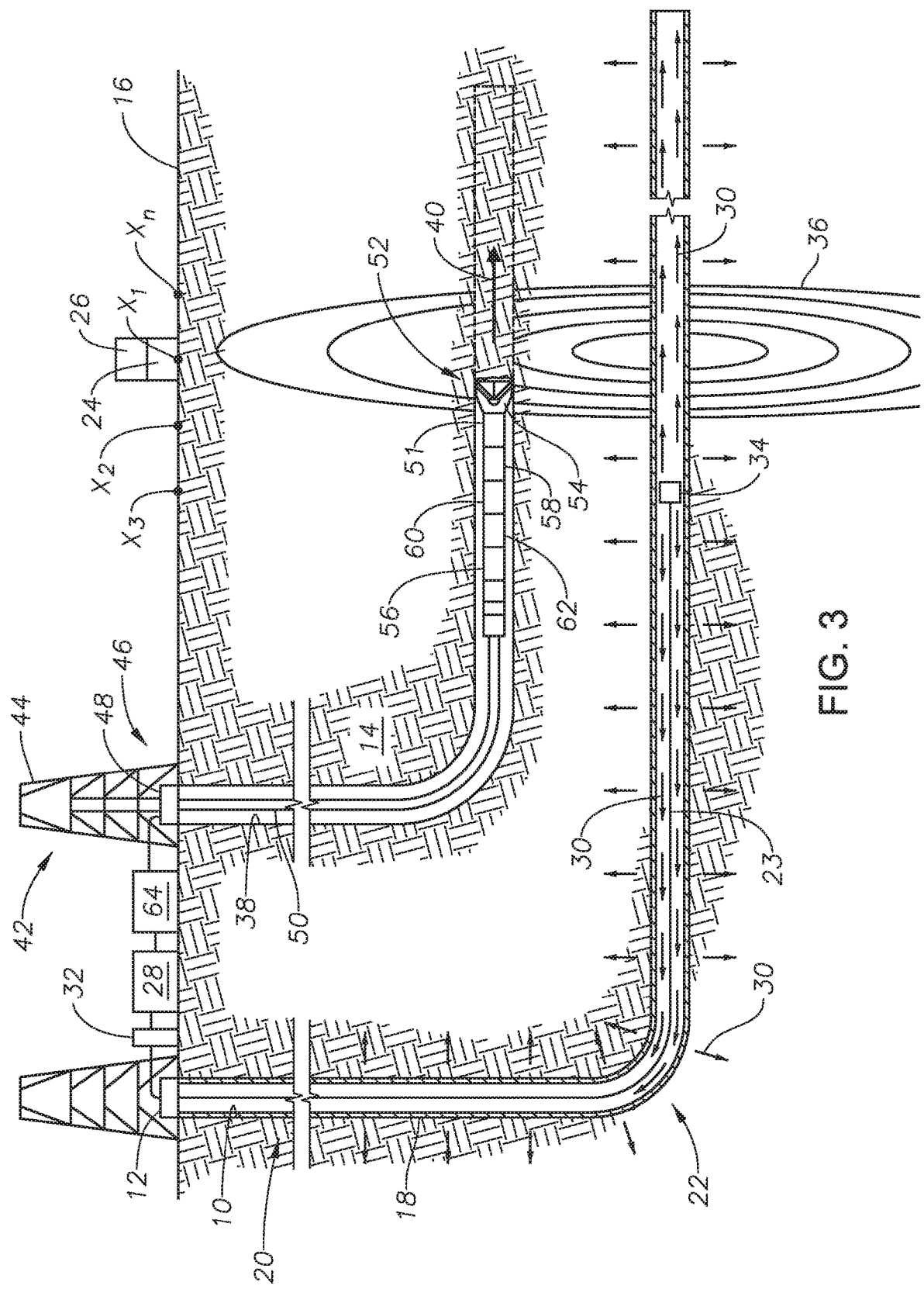
FIG. 3 illustrates a wellbore placement system employing an EM sensor positioned at the formation surface to place a second wellbore relative to a first wellbore.

FIG. 3 illustrates a first wellbore 10 and a second wellbore 38 positioned relative to one another in formation 14. In the illustration, the disposition of an existing first wellbore 10 in formation 14 is determined utilizing EM sensor 24 and system 26 deployed at surface 16. Thereafter, second wellbore 38 can be drilled along a desired path 40 selected to ensure optimal spacing from the first wellbore 10. In addition, during the drilling of second wellbore 38, at least one and preferably an array of EM sensors 24, each disposed at a known surface location at surface 16 can be utilized to adjust the trajectory or desired path 40 during drilling. Alternatively, where first and second wellbores 10, 38 are already drilled, EM sensor 24 may be placed at the surface 16 above a prescribed horizontal section of the two wellbores. A current 30 can then be injected into each wellbore separately and the magnetic field 36 from each wellbore is measured. Thereafter, the relative distance and angle between two wellbores can be calculated as discussed below.

In the illustration of FIG. 3, current injection system 28 includes an electrode 34 deployed downhole within first wellbore 10 to maximize current 30 on conductive member 18 along the portion of conductive member 18 that is the focus of the investigation.

Although the wellbores 10, 38 are shown to be vertically separated in FIG. 3 and generally each following along vertically separated, horizontal desired paths 40, the two wellbores could have separation in any other direction. Desired paths 40 is shown as running parallel to the horizontal portion 22 of wellbore 10 because in many cases, such as steam-assisted gravity drainage (SAGD) or coal bed degasification, it is desirable to drill a series of closely-spaced, parallel wells. However, in other embodiments, the desired paths 40 two or more wellbores may be vertically, horizontally or even angularly positioned relative to one another.

Figure 4:
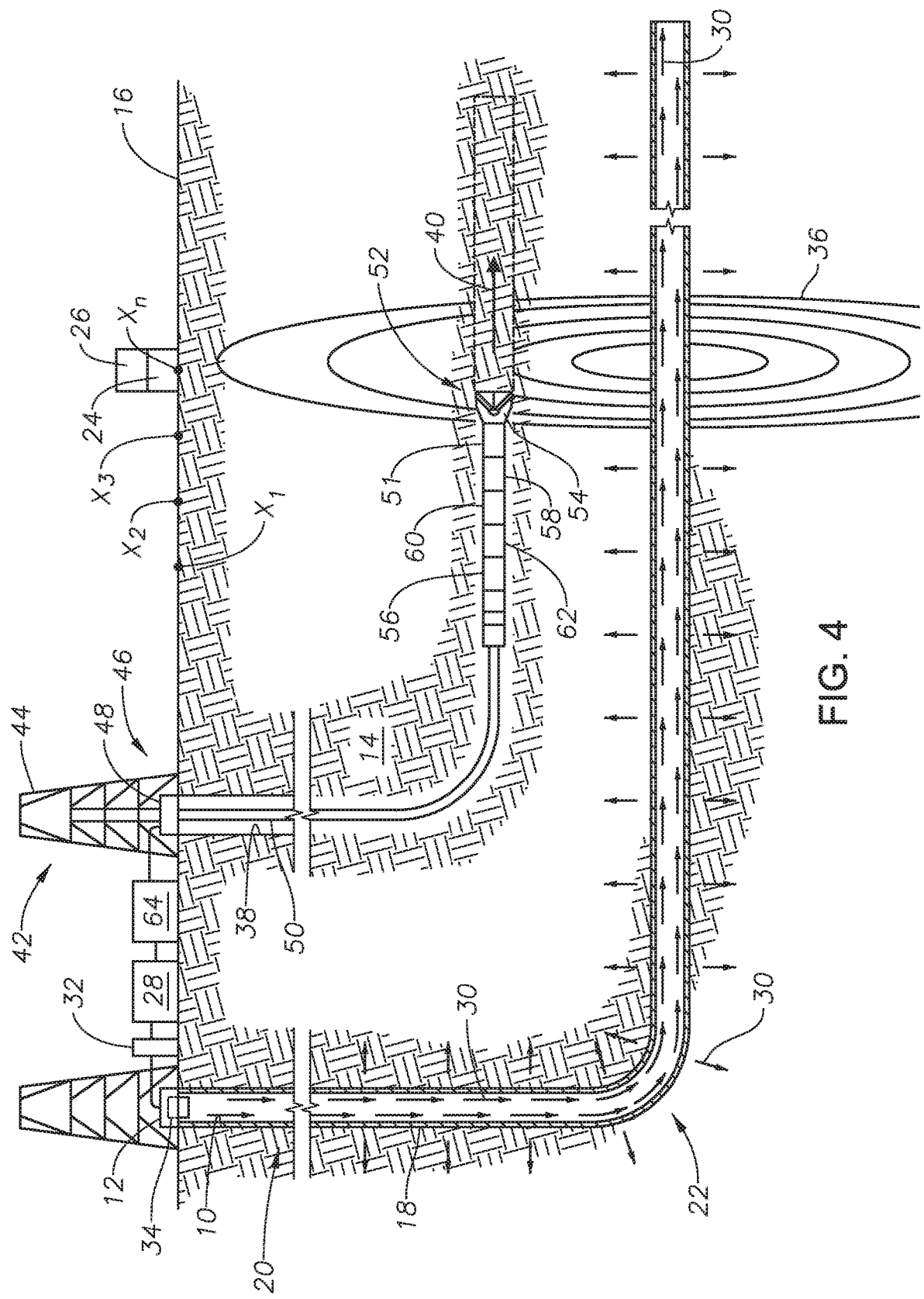
FIG. 4 illustrates another embodiment of a wellbore placement system employing an EM sensor positioned at the formation surface to place a second wellbore relative to a first wellbore.

FIG. 4 illustrates a first wellbore 10 and a second wellbore 38 disposed in formation 14 relative to one another. In the illustration, the disposition of first wellbore 10 in formation 14 is determined utilizing surface positioned EM sensor 24 and system 26 deployed at surface 16. Thereafter, second wellbore 38 can be drilled along a desired path 40 selected to ensure optimal spacing. In addition, during the drilling of second wellbore 38, at least one and preferably an array of EM sensors 24 of known surface locations at surface 16 can be utilized to adjust the trajectory or desired path 40 during drilling.

In the illustration of FIG. 4, current injection system 28 includes an electrode 34 deployed at or otherwise electrically connected to the wellhead installation 12 (which may include a wellhead, blowout preventers, hangers, sleeves and the like) which is connected to conductive member 18 so as to form a direct electrical conveyance path for current 30 from the wellhead installation 12 to the portion of conductive member 18 that is the focus of the investigation.

Figure 5:
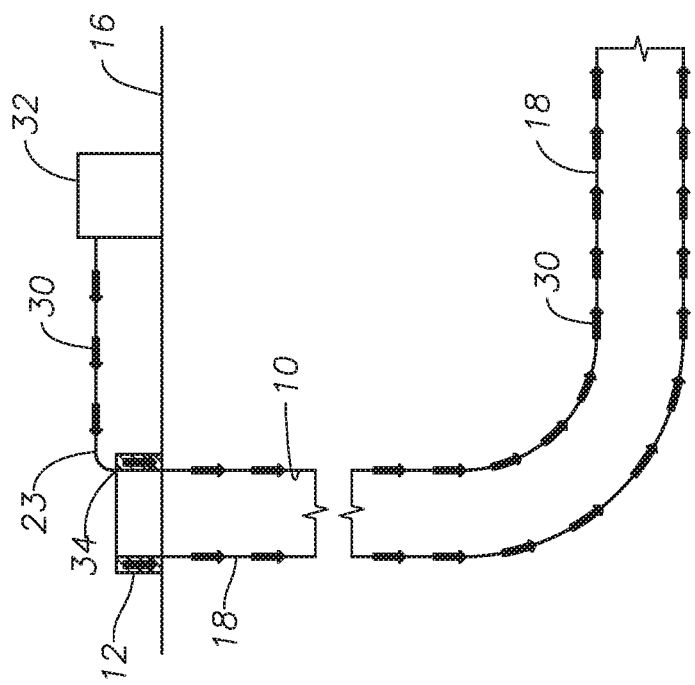
FIG. 5 illustrates the wellbore placement system of FIG. 2 utilizing surface excitation.

FIG. 5 illustrates in more detail the excitation arrangement shown in FIG. 4 in which a current 30 is directly injected onto an elongated conductive member deployed in a wellbore (as opposed to indirect injection in which a current travels through the formation). Specifically, a current source 32 located at the surface 16 generates a current 30 that is conveyed via an insulated cable 23 to electrode 34 which is in direct electrical communication with an elongated conductive member deployed in a wellbore, such as wellbore 10. In one or more embodiments, electrode 34 may be directly clamped or connected to a wellhead installation 12, which is in direct electrical contact with the elongated conductive member 18 deployed in wellbore 10.

Figure 6:
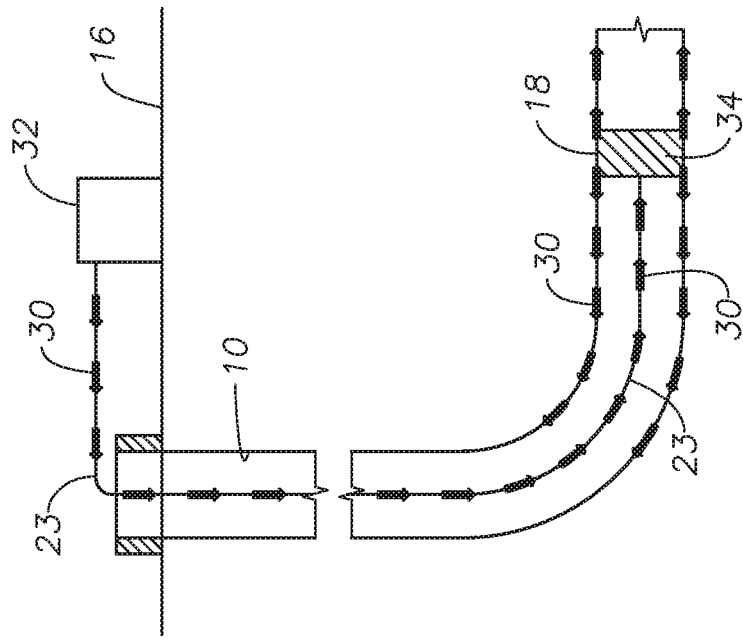
FIG. 6 illustrates the wellbore placement system of FIG. 3 utilizing downhole excitation.

FIG. 6 illustrates in more detail the excitation arrangement shown in FIG. 3 in which current 30 is directly injected onto an elongated conductive member deployed in a wellbore. Specifically, a current source 32 located at the surface 16 generates a current 30 that is delivered via an insulated cable 23 to an electrode 34 that is deployed downhole in the first wellbore 10 and is electrically attached to conductive member 18 at a point downhole of a wellhead, which point may be in the vicinity of the area that is targeted for investigation. In some embodiments, cable 23 may be shielded to minimize interference with the magnetic field generated by the conductive member 18.

Figure 7:
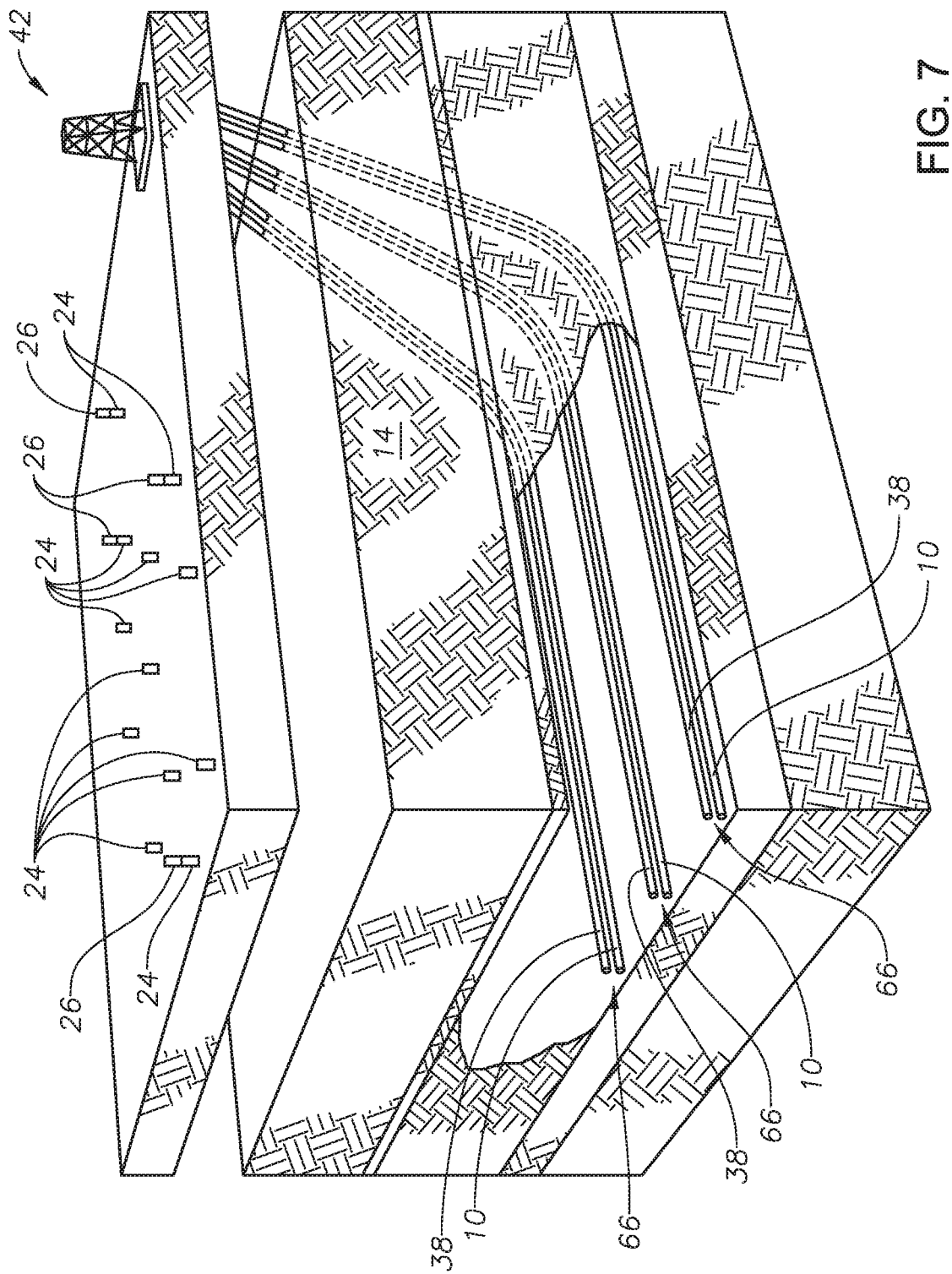
FIG. 7 illustrates the wellbore placement system of FIG. 2 with multiple pairs of wellbores.

Turning to FIG. 7, a plurality of pairs 66 of wellbores is shown in formation 14 extending from a drilling system 42. Each pair 66 consists of a first and second wellbore. In one or more embodiments, the wellbores of a pair 66 are arranged for SAGD recovery with a producer wellbore disposed below an injection wellbore, such as wellbores 10 and 38. In one or more embodiments, an EM sensor 24 and a location system 26 are positioned on surface 16 together. In one or more embodiments, a two-dimensional surface array of EM sensors 24 may be deployed as shown. Each EM sensor 24 in the array may include a location system 26. Alternatively, each EM sensor 24 may be deployed in the array at a known location where a location system 26 may be utilized to identify the location of the EM sensor 24 at the time of deployment for subsequent association with magnetic field data generated by measuring a magnetic field with the particular EM sensor 24.

EM sensor 24 and location system 26 deployed at surface 16, together with a direct current injection system 28 configured to generate magnetic fields 36 about a wellbore 10, 38, generally form a wellbore ranging system disposed to determine the placement/location/position of a wellbore in a formation and spacing between multiple wellbores for a particular operation. The wellbore ranging system consists of two parts: (i) a direct current injection system 28 to directly inject current on an conductive member deployed in a target wellbore in order to generating an magnetic field 36 about the target wellbore; and (ii) an EM sensor 24 and position system 26 disposed at the surface of a formation to measure the magnetic field 36 at a particular location X along the surface 16.

The foregoing provides a surface ranging system and method that can be utilized either to determine the location of a single wellbore in a formation or determine a relative spatial relationship, such as a distance or a direction or both, between two wellbores, such as an injector/producer wellbore pair. A current is injected directly onto a conductive member deployed in a first wellbore. The resulted current flow will generate a magnetic field 36 about the wellbore, which magnetic field will propagate through formation 14 and can be measured at the surface by surface EM sensor 24. The surface EM sensor 24 may be a hand-held device carried by a person. In one or more embodiments, the person moves along surface 16 while holding the EM sensor 24 to make magnetic field measurements at different surface locations X along the surface 16. A location system 26, such as a GPS system or other surface positioning device, is used to accurately determine the location of the point where magnetic field measurements are made. The same procedure is carried out for second wellbore 38 and magnetic field 36 generated therefrom. The decrease in magnetic field strength as distance increases away from the conductive member 18 is proportional to $1/r$ as compared to use of a solenoid source, which is proportional to $1/r^3$, where r is the distance to the conductive member 18. Hence, stronger magnetic field 36 signals can be received at the surface and expanded detection range can be achieved utilizing direct current injection as described herein.

Figure 8:
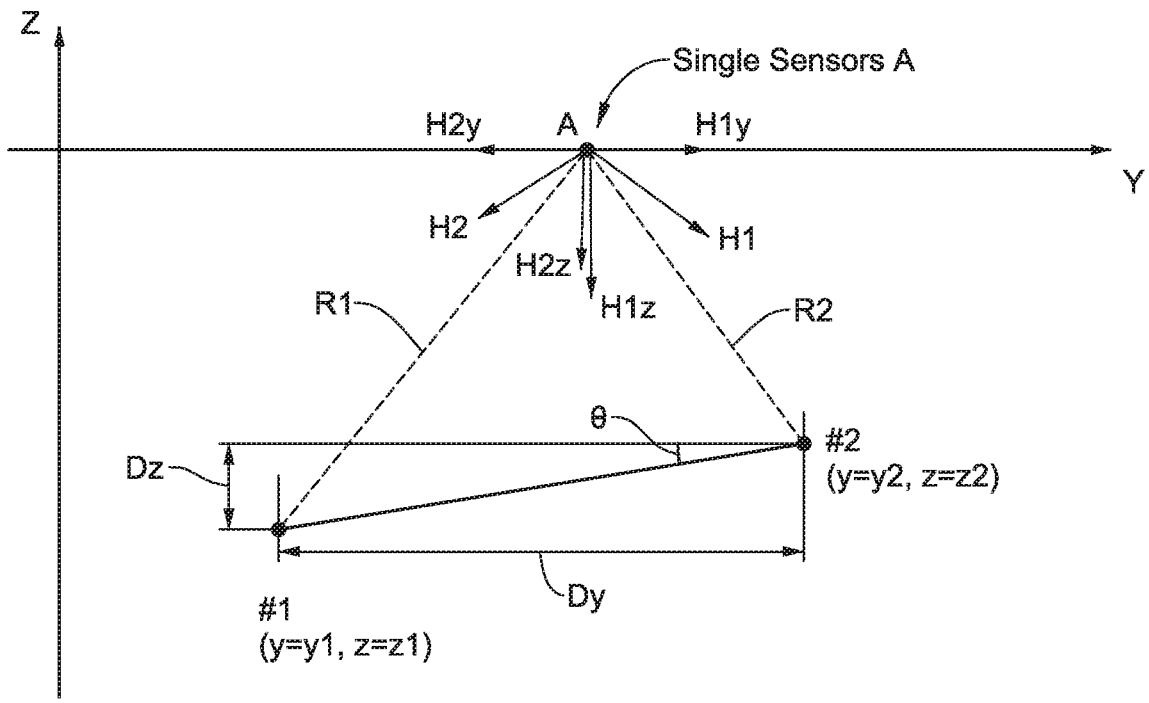
FIG. 8 illustrates the derivation of the relative distance and angle between wellbores #1 and #2 utilizing a single EM field measured at the surface.

FIG. 8 illustrates the derivation of relative distance and angle between a first wellbore (well #1) and a second wellbore (well #2) utilizing a single surface Sensor A, i.e., EM sensor 24, such as a single two-axial magnetometer, at a location on surface. Surface sensor A is utilized to measure a first magnetic field H1 (having components H1y, H1z) emanating from a first elongated conductive member deployed in a first wellbore and on which a current I has been injected by direct electrical contact with a current injection system. Measuring the first magnetic field generates first magnetic field data. Likewise, surface sensor A is utilized to measure a second magnetic field H2 (having components H2y, H2z) emanating from a second elongated conductive member deployed in a second wellbore and on which a current I has been injected by direct electrical contact with a current injection system. Measuring the second magnetic field generates second magnetic field data. From Ampere's law, using the first and second magnetic field data, a spatial relationship, i.e., distance or angle, can be determined:

$$H_1 = \frac{I}{2\pi R_1} \quad (1)$$
$$(1)$$
$$(2)$$
$$(1)$$

$$|H_{1,y}\hat{y} + H_{1z}\hat{z}| = \frac{I}{2\pi|R_{1y}\hat{y} + R_{1z}\hat{z}|} \quad (2)$$
$$(3)$$
$$(4)$$
$$(2)$$

$$\varphi = \arctan\left(\frac{H_{1y}}{H_{1z}}\right) \quad (3)$$
$$(5)$$
$$(6)$$
$$(3)$$

$$R_1 = \frac{I}{2\pi\sqrt{H_{1y}^2 + H_{1z}^2}} \quad (4)$$
$$(7)$$
$$(8)$$
$$(4)$$

$$R_{1y} = R_1 \sin\varphi = \frac{I}{2\pi\sqrt{H_{1y}^2 + H_{1z}^2}}\sin\varphi \quad (5)$$
$$(9)$$
$$(10)$$
$$(5)$$

$$\sin\varphi = \frac{\tan\varphi}{\sqrt{1+\tan\varphi^2}} = \frac{H_{1y}}{\sqrt{H_{1y}^2+H_{1z}^2}} \quad (6)$$
$$(11)$$
$$(12)$$
$$(6)$$

$$R_{1y} = \quad (7)$$

$$\frac{I}{2\pi\sqrt{H_{1y}^2+H_{1z}^2}}\sin\varphi = \frac{I}{2\pi\sqrt{H_{1y}^2+H_{1z}^2}}\frac{H_{1y}}{\sqrt{H_{1y}^2+H_{1z}^2}} = \frac{IH_{1y}}{2\pi H_1^2} \quad (13)(14)$$
$$(7)$$

Similarly, $$R_{1z} = \frac{IH_{1z}}{2\pi H_1^2}; \; R_{2y} = \frac{IH_{2y}}{2\pi H_2^2}; \; R_{2z} = \frac{IH_{2z}}{2\pi H_2^2}; \quad (8)$$
$$(15)$$
$$(16)$$
$$(8)$$

Hence, the spatial relationship between the two wells represented by the Y and Z distance between the two wells is, $$D_y = R_{2y} - R_{1y} = \frac{I}{2\pi}\left(\frac{H_{2y}}{H_2^2} - \frac{H_{1y}}{H_1^2}\right); \quad (9)(17)$$

$$D_z = R_{2z} - R_{1z} = \frac{I}{2\pi}\left(\frac{H_{2z}}{H_2^2} - \frac{H_{1z}}{H_1^2}\right) \quad (18)(9)$$

And the spatial relationship between the two wells represented by the relative angle between the two wells is, $$\theta = \arctan\left(\frac{D_z}{D_y}\right) = \arctan\left(\frac{H_{2z}H_1^2 - H_{1z}H_2^2}{H_{2y}H_1^2 - H_{1y}H_2^2}\right) \quad (10)(19)(20)(10)$$

Figure 9:
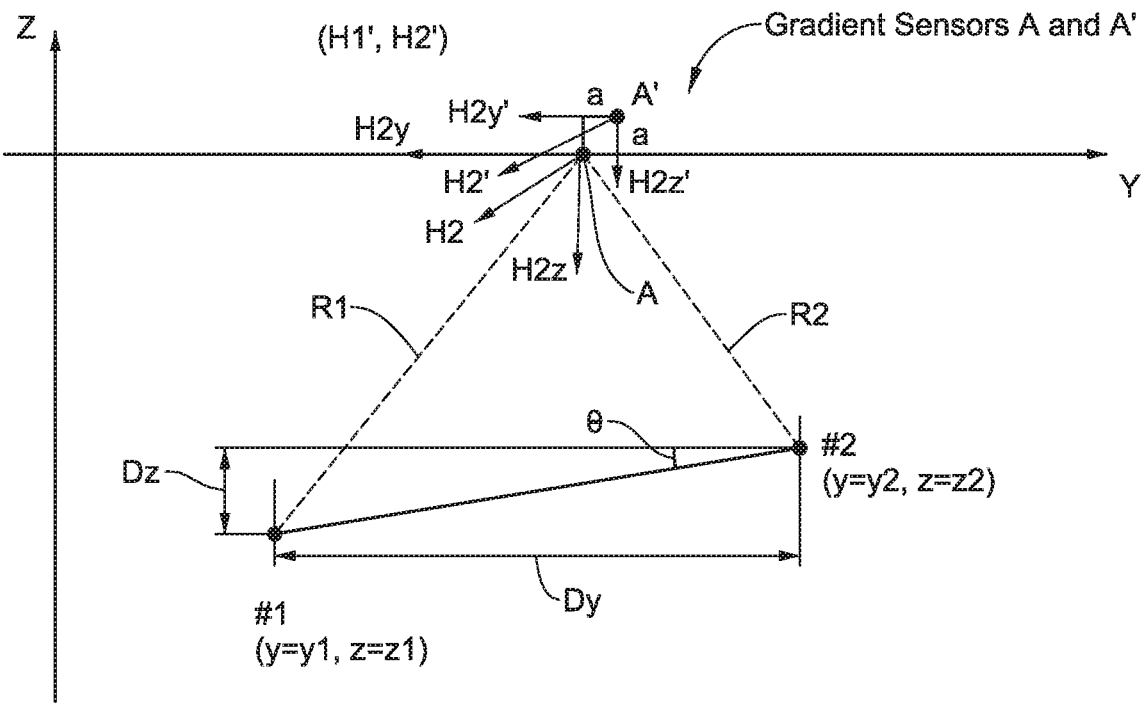
FIG. 9 illustrates the derivation of the relative distance and angle between wellbores #1 and #2 utilizing a gradient between EM fields measured at the surface.

FIG. 9 illustrates the derivation of relative distance and angle between a first wellbore (well #1) and a second wellbore (well #2) utilizing two surface Sensors A and A', i.e., EM sensors 24, such as a two magnetometers or a gradiometer at a location on surface. More specifically, in order to further improve the measurement accuracy and avoid need to know the pipe current per the example above, gradient sensors are employed as shown in FIG. 9. In one or more embodiments, two magnetometers A and A' are installed at two diagonal corners of a square plate (located in YZ plane) with dimension "a" although the disclosure is not limited to a particular geometric arrangement. Surface sensors A and A' are utilized to measure a first magnetic field H1 (having components H1y, H1z and H1y', H1z') emanating from a first elongated conductive member deployed in a first wellbore and on which a current I has been injected by direct electrical contact with a current injection system. Measuring the first magnetic field generates first magnetic field data. Likewise, surface sensors A and A' are utilized to measure a second magnetic field H2 (having components H2y, H2z and H2y1 and H2z') emanating from a second elongated conductive member deployed in a second wellbore and on which a current I has been injected by direct electrical contact with a current injection system. Measuring the second magnetic field generates second magnetic field data. Using the first and second magnetic field data, a spatial relationship, i.e., distance or angle, can be determined. Taking measurements for well #2 as an example, from Ampere's law and its first spatial derivative, we have $$H = \frac{I}{2\pi R} \text{ and } H_r^{(1)} = -\frac{I}{2\pi R^2} => R = -\frac{H}{H_r^{(1)}} \quad (11)(21)(22)(11)$$

Utilizing field components received by two magnetometers:

$$\vec{H} = \hat{y}\frac{(H_{2y} + H'_{2y})}{2} + \hat{z}\frac{(H_{2z} + H'_{2z})}{2} \quad (12)(23)(24)(12)$$

If the sensor separation "a" is small enough, (a<<λ), the derivative of H field can be approximated as:

$$\vec{H_r^{(1)}} = \hat{r} \cdot \left( \hat{y}\frac{(H'_{2y} - H_{2y})}{a} + \hat{z}\frac{(H'_{2z} - H_{2z})}{a} \right) \quad (13)(25)(26)(13)$$

The derived distance between wellbore and EM sensor is:

$$R_2 = \frac{\sqrt{\left(\frac{H_{2y} + H'_{2y}}{2}\right)^2 + \left(\frac{H_{2z} + H'_{2z}}{2}\right)^2}}{\sqrt{\left(\frac{H'_{2y} - H_{2y}}{a}\right)^2 + \left(\frac{H'_{2z} - H_{2z}}{a}\right)^2}} = \quad (14)(27)(28)(14)$$

$$\frac{a}{2} \cdot \frac{\sqrt{(H_{2y} + H'_{2y})^2 + (H_{2z} + H'_{2z})^2}}{\sqrt{(H'_{2y} - H_{2y})^2 + (H'_{2z} - H_{2z})^2}}$$

$$R_{2y} = R_2 \frac{H_{2y} + H'_{2y}}{\sqrt{(H_{2y} + H'_{2y})^2 + (H_{2z} + H'_{2z})^2}} = \quad (15)(29)(30)$$

$$\frac{a}{2} \cdot \frac{H_{2y} + H'_{2y}}{\sqrt{(H'_{2y} - H_{2y})^2 + (H'_{2z} - H_{2z})^2}} \quad (15)$$

Similarly, $$R_{1y} = \frac{a}{2} \cdot \frac{H_{1y} + H'_{1y}}{\sqrt{(H'_{1y} - H_{1y})^2 + (H'_{1z} - H_{1z})^2}}; \quad (16)(31)(32)$$

$$R_{1z} = \frac{a}{2} \cdot \frac{H_{1z} + H'_{1z}}{\sqrt{(H'_{1y} - H_{1y})^2 + (H'_{1z} - H_{1z})^2}}; \quad (16)$$

$$R_{2z} = \frac{a}{2} \cdot \frac{H_{2z} + H'_{2z}}{\sqrt{(H'_{2y} - H_{2y})^2 + (H'_{2z} - H_{2z})^2}}$$

Hence, the spatial relationship between the two wells represented by the Y and Z distance between two wells is, $$D_y = R_{2y} - R_{1y} = \frac{a}{2} \cdot \left( \frac{H_{2y} + H'_{2y}}{\sqrt{(H'_{2y} - H_{2y})^2 + (H'_{2z} - H_{2z})^2}} - \frac{H_{1y} + H'_{1y}}{\sqrt{(H'_{1y} - H_{1y})^2 + (H'_{1z} - H_{1z})^2}} \right); \quad (17)(33)(34)(17)$$

$$D_z = R_{2z} - R_{1z} = \frac{a}{2} \cdot \left( \frac{H_{2z} + H'_{2z}}{\sqrt{(H'_{2y} - H_{2y})^2 + (H'_{2z} - H_{2z})^2}} - \frac{H_{1z} + H'_{1z}}{\sqrt{(H'_{1y} - H_{1y})^2 + (H'_{1z} - H_{1z})^2}} \right);$$

The spatial relationship between the two wells represented by the derived angle between them is:

$$\theta = \arctan\left(\frac{D_z}{D_y}\right) \quad (18)(35)(36)(18)$$

In the preceding analysis, it will be appreciated that separation between EM senor pairs is not limited by the diameter of the elongated conductive member. Hence, bigger separation can be set and large detection distance can be achieved.

Figure 10A:
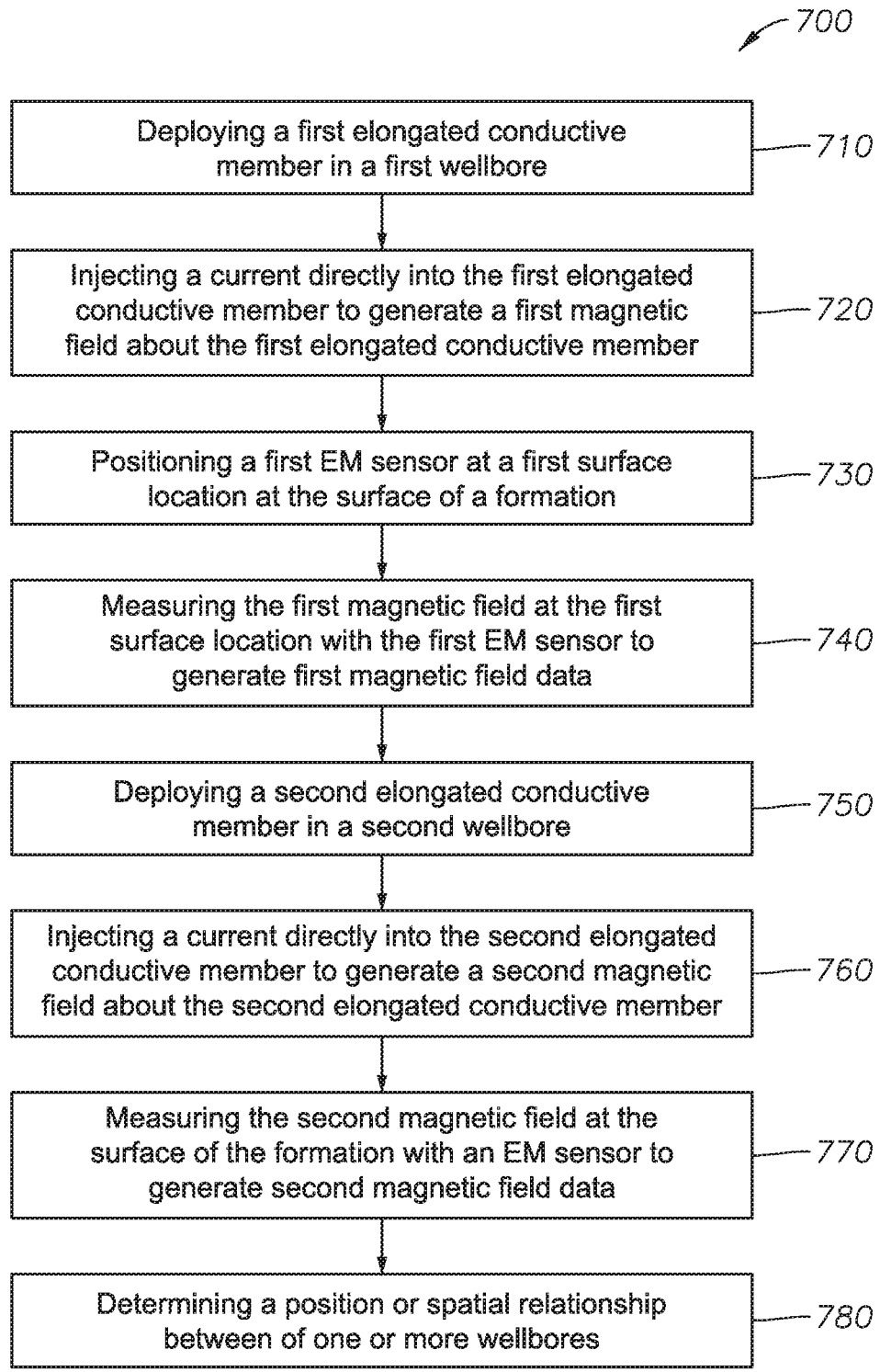
FIG. 10a is an EM ranging method utilizing Ampere's law for determining relative the location of a wellbore in a formation or the distance and angle between two wellbores.

Thus, generally, based on Ampere's law, the foregoing Equations 1-18 can be utilized in an EM surface ranging method 700 as illustrated in FIG. 10a. Specifically, in a first step 710, a first elongated conductive member is deployed in a first wellbore. The wellbore may be in the process of being drilled or may be a completed section. The elongated conductive member may be wellbore casing disposed in the wellbore, a drillstring or other conductive apparatus as described above. In step 720, a current is injected directly into the first elongated conductive member. The current may be injected by a current injection system. Direct injection has the meaning as described above. The current traveling along the first elongated conductive member results in an electromagnetic (EM) field on the first conductive member. As such, a first magnetic field is generated about the first elongated conductive member. The first magnetic field propagates out into the formation around the first wellbore in which the first conductive member is deployed, and in particular, propagates towards the surface of the formation.

In step 730, a first EM sensor as described herein is positioned on the surface of the formation above the target wellbore. More particularly, the first EM sensor is positioned on the surface at a first surface location, the coordinates of which are determined by a location system as described herein. The location system utilized to identify the first surface location thereby generates first surface location data. In one or more embodiments, a plurality of EM sensors may be positioned in a two dimensional array on the surface. In such case, each EM sensor has a specific surface location associated with it (as determined or otherwise dictated by a location system).

Once positioned, the first EM sensor can be utilized, in step 740, to measure the first magnetic field at the first surface location. These measurements generate first magnetic field data. This first magnetic field data can be associated with the first surface location data in order to identify the coordinates at which the magnetic field was measured.

While the foregoing steps 710-740 may be utilized to determine the orientation of a single wellbore in a formation, they may also be utilized to determine the distance between two wellbores, or a first wellbore and a second wellbore in the process of being drilling. Thus, in one or more embodiments, in step 750, a second elongated conductive member is deployed in a second wellbore. As suggested, in some embodiments, the second wellbore may be in the process of being drilled. In such cases, the elongated conductive member may be a drillstring being utilized to drill the second wellbore. With the drillstring being used as the elongated conductive member, there is no need to trip the drillstring out of the second wellbore in order to conduct the ranging operations.

In any event, at step 760, similar to step 720, a current is injected directly into the second elongated conductive member. The current may be injected by a current injection system. The current traveling along the second elongated conductive member results in an electromagnetic (EM) field on the second conductive member. As such, a second magnetic field is generated about the second elongated conductive member. The second magnetic field propagates out into the formation around the second wellbore in which the second conductive member is deployed, and in particular, propagates towards the surface of the formation.

In step 780, the second magnetic field is measured at the surface of the formation with an EM sensor to generate second magnetic field data. In one or more embodiments, the EM sensor utilized to measure the second magnetic field is the first EM sensor, while in other embodiments, the EM sensor utilized to measure the second magnetic field is a second, alternate or other EM sensor different from the first EM sensor. Similarly, in one or more embodiments, the second magnetic field is measured at the same surface location, namely the first surface location, as the location where the first magnetic field is measured, while in other embodiments, the second magnetic field is measured at a second surface location different than the first location. Thus, each set of magnetic field data will have surface location data associated with it.

Finally, once the magnetic field data has been generated for the first and second wellbores, at step 790, a relative spatial relationship between the first wellbore and the second wellbore can be determined.

It will be appreciated that the preceding surface ranging methods has been found to be most effective where vertical depth of the wellbore under investigation is less than 100 meters (VD<100 m). If deeper wells are to be investigated or drilled, i.e., VD>100 m, Ampere's law no longer holds because the horizontal section of the pipe is not long enough compare to the away distance of the surface sensor. The simple linear relation (2) between H, I, and D begins to break down and accuracy may be degraded. Thus, in one or more embodiments where VD>100 m, in order to derive distance D from measured H field, a numerical inversion process is utilized. Since the gradient equation (4) is also not applicable in these embodiments, only one magnetometer is necessary.

Figure 10B:
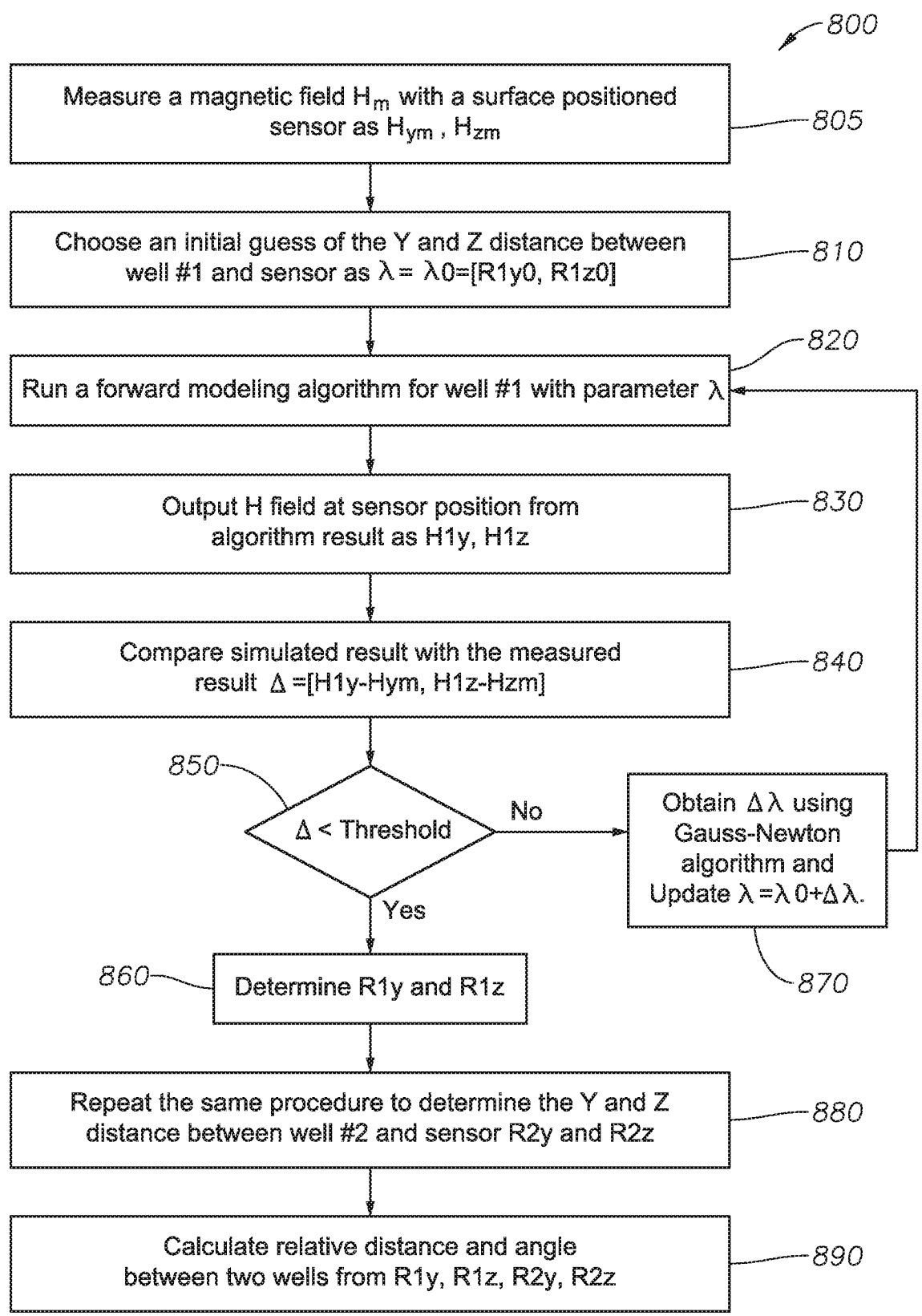
FIG. 10b is an EM ranging method utilizing inversion for determining relative distance and angle between wellbores.

More particularly, in FIG. 10b, a method 800 of EM surface ranging utilizing inversion is illustrated. In step 805, a magnetic field $H_m$, from well #1 is measured with a surface positioned EM sensor, namely, Sensor A, such as EM sensor 24. The measured magnetic field $H_m$ is characterized by components $Hy_m$ and $Hz_m$. Measurements of the magnetic field may be taken utilizing a surface positioned EM sensor 24 and position system 26 as described herein. More particularly, a magnetic field is generated from well #1 by directly applying a current to an elongated conductive member deployed in well #1. Although this step of the disclosure is not limited to a particular method for generating the magnetic field except as set forth herein, in one or more embodiments, the magnetic field may be generated as described in accordance with FIGS. 1 and 2, wherein an electric current is directly injected onto a conductive member deployed in well #1 to generate a magnetic field about well#1. In one or more embodiments and as otherwise described above, the conductive member may be the drillstring utilized to drill well#1. In other embodiments, the conductive member may be wellbore casing deployed in well #1. As the magnetic field is generated, the magnetic field is measured and magnetic field data (H1) is generated utilizing an EM senor positioned at one or more known surface locations as described above, and thereafter, the relative location of well #1 in the formation can be determined. In this regard, GPS data identifying the particular surface location where the magnetic field $H_m$ is measured may be included with the magnetic field data for the particular surface location.

In step 810, with respect to well #1, an estimation or initial guess is made as to the distance λ between well #1 and a particular surface location, such as $X_1$ shown in FIG. 1, of a surface positioned Sensor A. In particular, a Y distance between well #1 and the surface positioned Sensor A is estimated and the Z distance between well #1 and the surface positioned Sensor A is estimated. The initial guess for λ is $\lambda_0$ which represents $R1y_0$, $R1z_0$.

In step 820, a forward modeling algorithm is applied for well #1 utilizing the initial estimate for parameter λ. In one or more embodiments, a forward modeling algorithm is utilized in step 820. The forward modeling algorithm may be based on Integral Equation, Method of Moments, Finite Difference, Finite Element, Semi-Analytical Formulation, or any similar algorithm that serves similar purpose.

At 830, the forward modeling algorithm yields a simulated magnetic field H1 for a particular Sensor A (at a particular surface location) and the results of the simulated magnetic field are outputted as $H1_y$, $H1_z$ for the particular surface location. In step 840, the simulated magnetic field H1 is compared to the measured magnetic field $H_m$ and a difference Δ between the simulated results and the measured results is determined $\Delta = [H1_y - Hy_m, H1_z - Hz_m]$.

In step 850, if the difference Δ between the simulated magnetic field and the measured magnetic field is less than or equal to a predetermined threshold, then the method progresses to step 860 where the distance R1 between Sensor A and the target well #1 is determined as $R1_y$ and $R1_z$. Alternatively at step 850, if the difference Δ between the simulated magnetic field and the measured magnetic field is greater than a predetermined threshold, then the method progresses to step 870.

In step 870, $\Delta\lambda$ is obtained using an appropriate algorithm and $\lambda$ is updated to be $\lambda_0 + \Delta\lambda$, after which, the updated $\lambda$ is utilized to repeat the method beginning at step 820. In one or more embodiments, the Guass-Newton algorithm may be used to obtain $\Delta\lambda$.

While the foregoing steps 810-860 may be utilized to determine the location of a single wellbore, i.e., well #1, in a formation for various purposes, in one or more embodiments, it may be desirable to determine the relative positions of multiple wellbores, i.e., well #1 and well #2, as suggested above. In such cases, once $R1_y$ and $R1_z$ have been determined in step 860, as shown in step 880, the procedures of steps 810-860 may be repeated for well #2 to determine the distanced between Sensor A and the target well #2 in order to determine as $R2_y$ and $R2_z$.

Finally, in step 890, the a relative spatial relationship, such as distance and/or angle between well #1 and well #2, can be determined from $R1_y$, $R1_z$, $R2_y$ and $R2_z$.

Thus, FIG. 10b illustrates the inversion algorithm for deriving relative distance and angle between two wells. Moreover, it will be appreciated that while the inversion algorithm is desirable in instances where VD>100 m, the algorithm can also be utilized in cases where VD<100 m, as an alternative to the methods represented in Equations 1-18 and FIG. 10a above.

Figure 11:
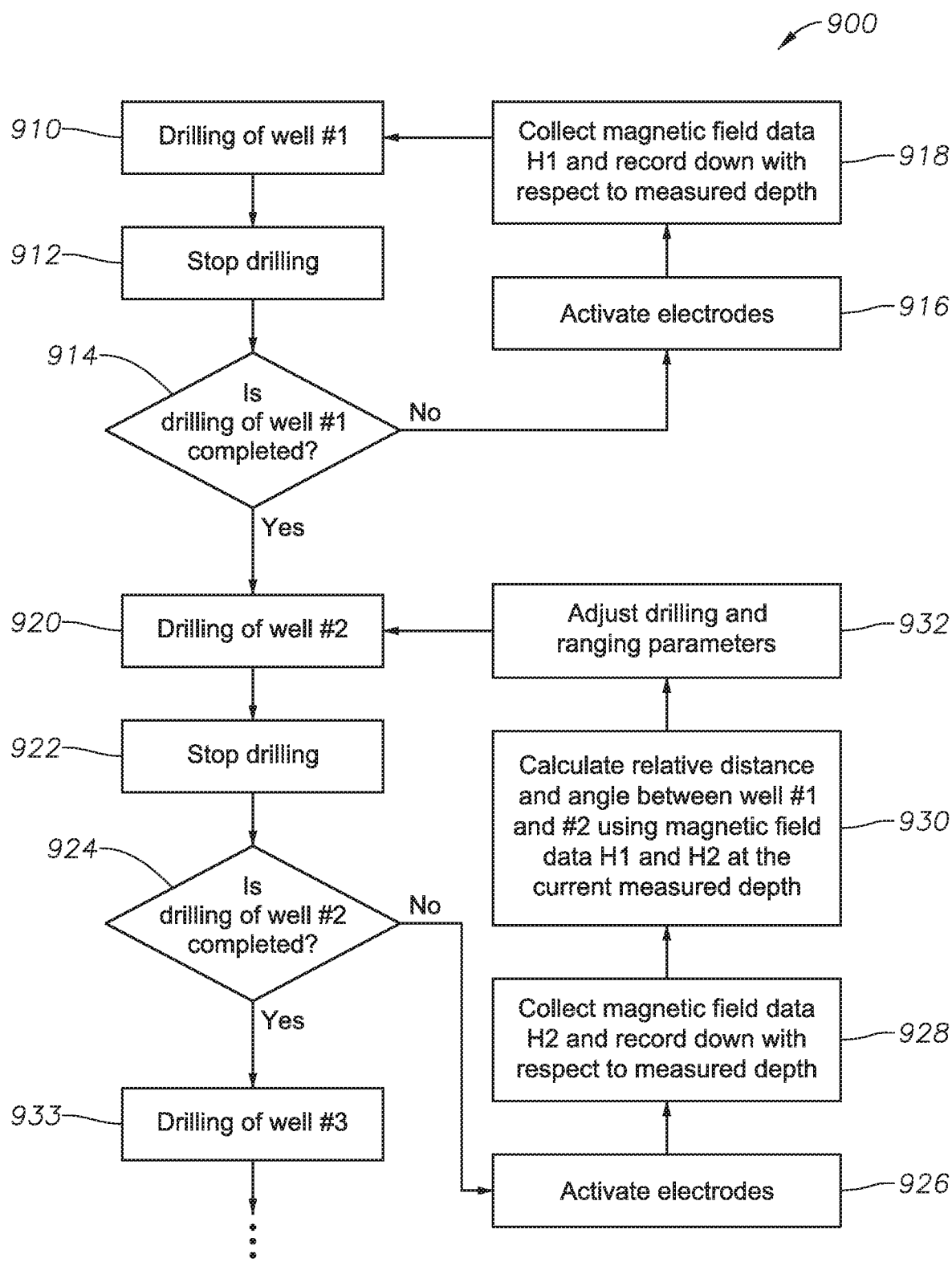
FIG. 11 is a flow chart illustrating a process of drilling multiple well pairs, according to one or more embodiments.

With reference to FIG. 11, surface ranging can be utilized in drilling a plurality of well pairs, such as, for example where drilling multiple SAGD wells is desired. Such a method 900 is illustrated in FIG. 11. Specifically, at step 910, drilling of a first wellbore (well #1) occurs. Specifically, drilling is initiated and is continued for a period of time. At step 912, the drilling of well #1 is suspended. At step 914, a determination is made as to whether well #1 is complete. If the drilling of well #1 is not complete, then at step 916, a magnetic field is generated from the drillstring utilized to drill well #1. Although this step of the disclosure is not limited to a particular method for generating the magnetic field, in one or more embodiments, the magnetic field may be generated as described in accordance with FIGS. 1 and 2, wherein an electric current is directly injected onto a conductive member deployed in the first wellbore to generate a magnetic field 36 about the conductive member. In one or more embodiments and as otherwise described above, the conductive member can be the drillstring utilized to drill the first wellbore. In other embodiments, the BHA may carry another source for generating the magnetic field to inject the current on the BHA. As the magnetic field is generated, at step 918, magnetic field (H1) is measured and magnetic field data is generated utilizing an EM senor positioned at one or more known surface locations as described above, and thereafter, the relative location of well #1 in the formation is determined. At this point, as necessary, the trajectory of well #1 may be adjusted, as desired, based on the magnetic field data, after which drilling of well #1 continues at step 910. The foregoing steps 910-918 may be repeated as necessary until well #1 reaches a predetermined depth and is deemed to be completed.

The completed well #1 may thereafter be cased as desired, which casing may be utilized in future operations as the conductive member for subsequent surface ranging operations. In this regard, to the extent a first cased wellbore already exists and is in place, the method 900 can begin with step 916, continue to step 918 in order to determine the disposition of the first wellbore in the formation, and then jump to step 920 described below.

At step 914, to the extent well #1 is deemed completed, then the method progresses to step 920. At step 920, drilling of a second wellbore (well #2) occurs. Specifically, drilling is initiated and is continued for a period of time.

At step 922, the drilling of well #2 is suspended. At step 926, a determination is made as to whether well #2 is complete. If the drilling of well #2 is not complete, then at step 926, a magnetic field is generated from the drillstring utilized to drill well #2. Although this step of the disclosure is not limited to a particular method for generating the magnetic field, in one or more embodiments, the magnetic field may be generated as described in accordance with FIGS. 1 and 2, wherein an electric current is directly injected onto a conductive member deployed in the second wellbore to generate a magnetic field 36 about the second wellbore. In one or more embodiments and as otherwise described above, the conductive member can be the drillstring utilized to drill the second wellbore. In other embodiments, the BHA may carry another source for generating the magnetic field. As the magnetic field is generated, at step 928, magnetic field (H2) is measured and magnetic field data is generated utilizing an EM senor positioned at one or more known surface locations as described above.

At step 930, the foregoing steps 810-890 of the surface ranging technique 800 described above are utilized to calculate the relative distance and angle between well #1 and well #2 using the magnetic field data resulting from measurement of the magnetic field by the surface EM sensor. At this point, as necessary, the trajectory of well #2 may be adjusted, as desired, based on the magnetic field data and the determined relative distance and angle, after which drilling of well #2 continues at step 920. The foregoing steps 920-932 may be repeated as necessary until well #2 reaches a predetermined depth and is deemed to be completed. The completed well #2 may thereafter be cased as desired, which casing may be utilized in future operations as the conductive member for subsequent surface ranging operations.

At step 924, to the extent well #2 is deemed completed and a third wellbore (well #3) is to be drilled, then the method progresses to step 933.

At step 933, drilling of a third wellbore (well #3) occurs. Specifically, drilling is initiated and is continued for a period of time. The foregoing steps 920-932 can then be repeated for as many additional wellbores as desired.

Figure 12:
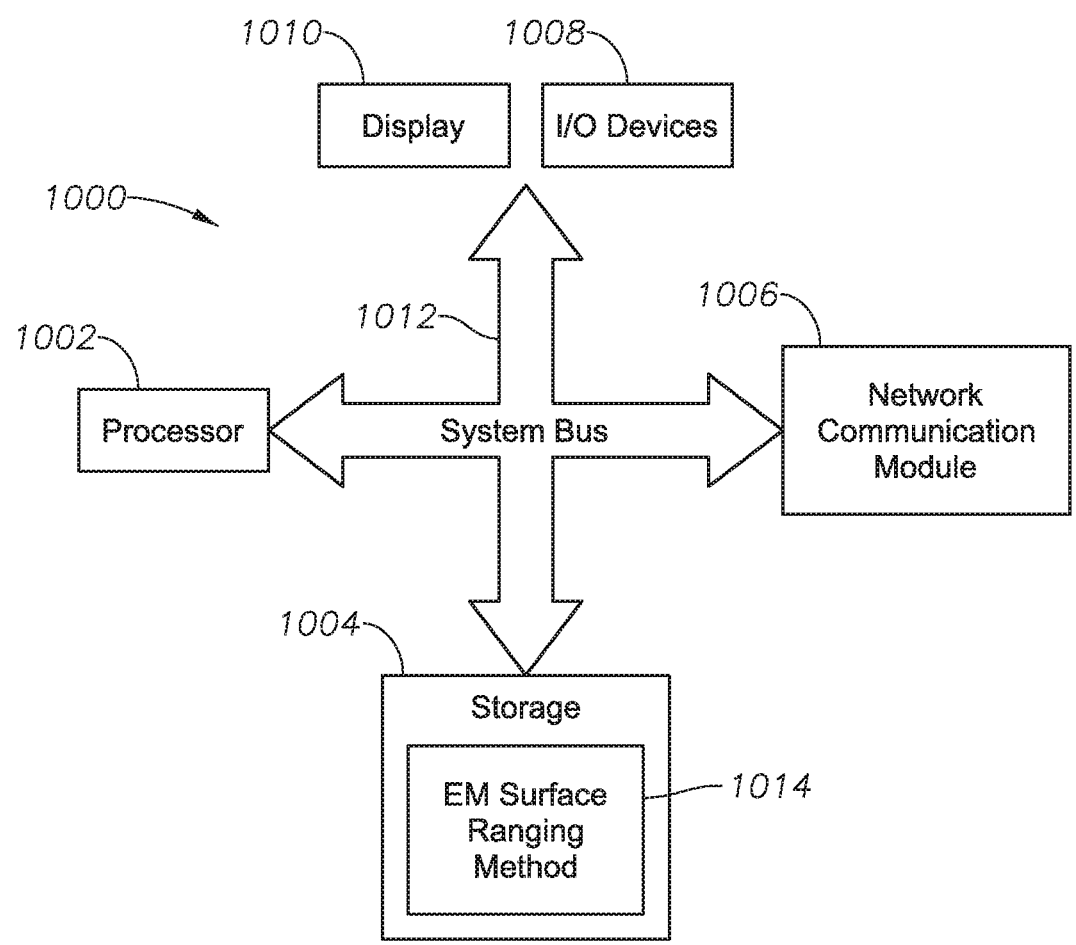
FIG. 12 is a block diagram of a computer system adapted for implementing embodiments of the EM surface ranging systems described herein.

FIG. 12 is a block diagram of an exemplary computer system 1000 adapted for implementing the surface ranging systems and methods as described herein, and which, in one or more embodiments, may form a part of control system 64 to coordinate injection of current 30 onto a conductive member deployed in a first wellbore, processing of EM data, including related surface location data for the EM sensor utilized to measure a magnetic field, determination of the location of a first wellbore in a formation or the position a first wellbore relative to a second wellbore and, in some embodiments, controlling, and as necessary, adjusting the trajectory or direction of the path 40 along which a wellbore is being drilled. In one or more embodiments, the computer system 1000 includes at least one processor 1002, a non-transitory, computer-readable storage 1004, an optional network communication module 1006, optional I/O devices 1008, and an optional display 1010, and all interconnected via a system bus 1012. To the extent a network communications module 1006 is included, the network communication module 1006 is operable to communicatively couple the computer system 1000 to other devices over a network. In one embodiment, the network communication module 1006 is a network interface card (NIC) and communicates using the Ethernet protocol. In other embodiments, the network communication module 1006 may be another type of communication interface such as a fiber optic interface and may communicate using a number of different communication protocols. In other embodiments, network communication module 1006 communicates with EM sensor 24, location system 26, or a portable ranging unit integrating these sensors as described above. It is recognized that the computer system 1000 may be connected to one or more public (e.g. the Internet) and/or private networks (not shown) via the network communication module 1006. Such networks may include, for example, servers upon which EM data and related positional date for the surface ranging methods as described herein is stored. Software instructions executable by the processor 1002 for implementing an EM surface ranging method 1014 in accordance with the embodiments described herein, may be stored in storage 1004. EM surface ranging method may be any one of the methods described herein, including, method 800 or method 900 referenced above. It will also be recognized that the software instructions comprising the surface ranging method 1014 may be loaded into storage 1004 from a CD-ROM or other appropriate storage media.

While the foregoing methods have been described as useful in operations such as SAGD or placement of well pairs relative to one another, in other embodiments, the methods may be utilized to drill in-fill wells. For example, in one embodiment, a first set of wellbores may be drilled from a first wellsite, and a second set of in-fill wellbores may be drilled from a second wellsite remove from the first wellsite. As used herein, a wellsite is a location that may have one or more drilling rigs from which a plurality of wellbores are drilled. In another embodiment, the method may be utilized to drill intersecting wells. In another embodiment, the method may be utilized to drill wells that intersect under a river crossing or shallow body of water. In such case, the surface EM sensor and position sensor may be deployed on or in the body of water in order to take the EM measurements. Finally, in another embodiment, the method may be utilized to avoid collision between deviated wells that have some horizontal displacement.

The ranging technique proposed in this disclosure positions the EM sensor at the surface above a wellbore. Current is directly injected at the wellhead or downhole from within the wellbore into casing or other conductive member disposed in the wellbore.

Thus, an electromagnetic (EM) wellbore surface ranging system has been described. Embodiments of the EM surface ranging system may generally include a first wellbore extending from the surface of a formation, the first wellbore having a first elongated conductive member disposed therein; an EM sensor disposed on the surface of the formation; a current injection system in direct electrical contact with the elongated conductive member; and a location system configured to identify a surface location of the EM sensor. In other embodiments, an EM surface ranging system may generally include a first wellbore extending from the surface of a formation, the first wellbore having a first elongated conductive member disposed therein; a second wellbore extending from the surface of a formation, the second wellbore having a second elongated conductive member disposed therein; an EM sensor disposed on the surface of the formation; a current injection system in direct electrical contact with an elongated conductive member; and a location system configured to identify a surface location of the EM sensor. Similarly, an EM surface ranging system has been described and generally includes a handheld unit comprising an EM sensor and a GPS location system; an elongated conductive member; and a current injection system in direct electrical contact with the elongated conductive member.

For any of the foregoing embodiments, the system may include any one of the following elements, alone or in combination with each other:

The location system comprises a GPS.
The location system comprises an accelerometer.
The EM sensor comprises a magnetometer.
The EM sensor comprises two spaced apart magnetometers.
The EM sensor comprises a magnetic gradiometer.
A second EM sensor disposed on the surface of the formation.
A second wellbore extending from the surface of a formation, the second wellbore having a second elongated conductive member disposed therein; and a current injection system in direct electrical contact with the second conductive member.
The current injection system is in direct electrical contact with the conductive member at a wellhead.
The current injection system is in direct electrical contact with the conductive member at location along the length of the conductive member and within the first wellbore.
A wellhead installation, wherein the current injection system is in electrical contact with the wellhead installation and the wellhead installation is in electrical contact with the first conductive member.
The current injection system in direct electrical contact with the first conductive member is the same current injection system in direct electrical contact with the second conductive member.
The conductive member is casing disposed in the wellbore.
The conductive member is a drillstring deployed in the wellbore.
The drillstring comprises a bottom hole assembly.
The drillstring comprises a drill bit.
The system comprises a first and a second wellbore, each with a conductive member positioned therein.
The EM sensor and location system are integrated into a single, hand-held unit.
A current injection system comprises a current source electrically connected to an electrode.
An electrode is disposed in the second wellbore.
The second conductive member is a drillstring, and wherein the current injection system in direct electrical contact with the first conductive member is a first current injection system deployed at the surface and the current injection system in direct electrical contact with the second conductive member is a second current injection system carried by the drillstring.
The electrode is electrically connected to the elongated conductive member.
A wellhead installation at the surface.
A plurality of spaced apart EM sensors arranged in an array at the surface.
A plurality of spaced apart GPS systems arranged in an array at the surface.
Each EM sensor deployed at the surface has a GPS system deployed with it.
The location system is configured to identify a surface location of each of a plurality of EM sensors.

Thus, an EM wellbore surface ranging method has been described. Embodiments of the EM surface ranging method may generally include deploying a first elongated conductive member in a first wellbore; injecting a current directly into the first elongated conductive member to generate a first magnetic field about the first elongated conductive member; positioning a first EM sensor at a first surface location at the surface of a formation; and measuring the first magnetic field at the first surface location with the first EM sensor to generate first magnetic field data. In other embodiments, an EM surface ranging method includes deploying a conductive member in a first wellbore extending from the surface of a foundation, directly attaching a current source to the conductive member and injecting a current into the conductive member to generate a magnetic field about the conductive member, positioning an EM sensor at a first location at the surface and utilizing the EM sensor to measuring a first set of magnetic field data from the first wellbore, positioning an EM sensor at a second location at the surface and measuring a second set of magnetic field data from the first wellbore, and determining the location of the wellbore in the formation based on the first and second sets of magnetic field data. In other embodiments, an EM surface ranging method includes deploying a conductive member in first and second wellbores, directly attaching a current source to the conductive member of the first wellbore, injecting a current into the conductive member of the first wellbore to generate a magnetic field about the first wellbore conductive member, positioning an EM sensor at a first location at the surface of a formation and recording a first set of magnetic field data from the first wellbore by utilizing the EM sensor to measure a magnetic field from the first wellbore, directly attaching a current source to the conductive member of the second wellbore, injecting a current into the conductive member of the second wellbore to generate a magnetic field about the second wellbore conductive member, positioning an EM sensor at a first location at the surface and recording a second set of magnetic field data from the second wellbore by utilizing the EM sensor at the first surface location to measure a magnetic field from the second wellbore, and determining a relative special relationship between the first and second wellbores based on the first and second sets of magnetic field data. In other embodiments, a wellbore placement system may generally include a computer program product comprising non-transitory computer-readable medium having stored thereon instructions executable by a computer for causing the computer to perform surface ranging for one or more wellbores, the computer-executable instructions comprising instructions for causing the computer to: receive an initial guess as to the distance $\lambda$ between a particular location X1 of a surface EM positioned sensor and a first wellbore, wherein the initial guess for $\lambda$ is $\lambda 0$ which represents R1y0, R1z0; running forward an algorithm utilizing the initial guess for parameter $\lambda$ with respect to the first wellbore is run forward; determining a simulated magnetic field H1 at the particular sensor location based on the algorithm and outputting the results of the simulated magnetic field as H1y, H1z; comparing the simulated magnetic field H1 to a measured magnetic field Hm and determining a difference $\Delta$ between the simulated results and the measured results;
if the difference $\Delta$ between the simulated results and the measured results is less than or equal to a predetermined threshold, determining a distance R1 between the surface EM sensor and the target wellbore; and if the difference $\Delta$ between the simulated results and the measured results is greater than a predetermined threshold, obtaining a $\Delta\lambda$ using an algorithm to updated $\lambda$ to be $\lambda 0+\Delta\lambda$, after which, the updated $\lambda$ is utilized to repeat the steps of receiving, running, determining and comparing. In other embodiments, an EM surface ranging method includes determining electromagnetic characteristics of a first wellbore and a second wellbore at a select location on the surface of a formation based on current injected directly into each of the wellbores from a current source in direct electrical communication with a conductive member deployed in each wellbore; utilizing the measured electromagnetic characteristics to determine a range between the two wellbores. In other embodiments, an inversion method for magnetic ranging includes measuring a magnetic field $H_m$ generated from a first wellbore with a surface positioned sensor; estimating the distance $\lambda$ between a particular surface location of the sensor and the first wellbore; applying a forward modeling algorithm utilizing the estimated distance $\lambda$ between the particular surface location of the sensor and the first wellbore to yield a simulated magnetic field H1 at the particular sensor location; comparing the simulated magnetic field H1 to the measured magnetic field $H_m$ and determining a difference $\Delta$ between the simulated results and the measured results; if the difference $\Delta$ between the simulated results and the measured results is greater than a predetermined threshold, revising estimated distance $\lambda$ and repeating the step of utilizing and comparing; and if the difference $\Delta$ between the simulated results and the measured results is less than or equal to a predetermined threshold, then determine a distance R1 between the surface sensor and the first wellbore.

For any of the foregoing embodiments, the method may include any one of the following, alone or in combination with each other:

Deploying a second elongated conductive member in a second wellbore; injecting a current directly into the second elongated conductive member to generate a second magnetic field about the second elongated conductive member; and measuring the second magnetic field at the surface of the formation with an EM sensor to generate second magnetic field data.

Determining the relative distance between the first and second wellbores based on the first and second sets of magnetic field data.

Determining the relative angle between the first and second wellbores based on the first and second sets of magnetic field data.

Determining a relative spatial relationship between the first wellbore and the second wellbore based on the first magnetic field data and the second magnetic field data, wherein the spatial relationship is selected from the group consisting of a distance and an angle.

The conductive member in one wellbore is a casing string and the conductive member in the other wellbore is a drilling string.

Begin drilling a second wellbore; suspend drilling and measure at the surface a set of electromagnetic data from the second wellbore; and thereafter, continuing to drill the second wellbore.

Adjusting the trajectory of a wellbore being drilled based on electromagnetic data measured at the surface of a formation.

The electromagnetic data includes measurement of a current directly injected into a conductive member in a wellbore and the magnetic field emanating from the conductive member.

The electromagnetic data excludes current measurements.

Determining the relative location of a surface deployed EM sensor.

Deploying a GPS system with a surface deployed EM sensor.

Measuring a magnetic field at two spaced apart locations on the formation surface.

Deploying two magnetometers on the formation surface.

Deploying a magnetometer on the formation surface.

Deploying a gradiometer on the formation surface.

Attaching a current injection system to a conductive member to form a direct electrical path therebetween.

Utilizing a casing in a wellbore as conductive member for receipt of a direct electrical injection.

Utilizing a drillstring in a wellbore as conductive member for receipt of a direct electrical injection.

Utilizing a location system to identify the first surface location and generate first surface location data; and associating the first magnetic field data with the first surface location data.

Deploying a conductive member in each of a first and second wellbore and directly attaching each conductive member to a current source.

Injecting an electrical current into a conducive member by directly attaching the current source to a wellhead with which the conductive member is in electrical communication.

Positioning an additional EM sensor adjacent the first EM sensor, but spaced apart therefrom; and utilizing the additional EM sensor to measure the first magnetic field, wherein the first magnetic field data comprises a magnetic gradient resulting from the measurements of the first magnetic field by the first EM sensor and the additional EM sensor.

The first elongated conductive member is a casing string and the second elongated conductive member is a drillstring, the method further comprising adjusting the trajectory of the second wellbore based on the first magnetic field data and the second magnetic field data.

Injecting an electrical current into a conducive member by directly attaching the current source to an electrode disposed in the wellbore at a location along the length of the conductive member.

Deploying a plurality of spaced apart EM sensors at the surface in an array.

Utilizing a GPS system to identify the location of the surface deployed EM sensor.

Determining a first location of an EM sensor on the surface and measuring a first set of electromagnetic data at the first location, moving the EM sensor to a second location on the surface and measuring a second set of electromagnetic data at the second location.

Drilling a first wellbore; directly injecting a current into casing disposed in the first wellbore and measuring at the formation surface an electromagnetic field emanating from the first wellbore; initiating drilling of the second wellbore; utilizing an EM sensor at the surface to measure a electromagnetic field emanating from the second wellbore.

Prior to the steps of injecting a current along a drillstring, suspending drilling of the wellbore being drilled; based on the measured temperature, adjusting the trajectory of the second wellbore; and following adjustment of the trajectory, continuing drilling of the second wellbore.

Making an electromagnetic ranging measurement; determining an azimuth angle to target from the electromagnetic ranging measurement; and adjusting the trajectory of the second wellbore so that the second wellbore at a select location along its length is within a desired azimuthal range.

Generating a magnetic field from the second wellbore by directly injecting a current into a conductive member in the first wellbore; measuring the magnetic field at the surface; based on the measured magnetic field, identifying an azimuth angle between the first wellbore and the second wellbore, the range comprising a lateral component and a vertical component; adjusting the second wellbore drilling trajectory path laterally based upon the EM data measured at the surface.

Optimizing the placement of the second wellbore relative to the first wellbore based on the the EM data measured at the surface.

Identifying a range between the wellbores, the range comprising a lateral component and a vertical component; adjusting the second wellbore drilling trajectory path laterally based upon the EM data measured at the surface.

Conducting advance recovery operations selected from the group consisting of SAGD, TAGD, THAI, VAPEX and fire flooding.

Altering the spacing between the first and second wellbores based on the EM data measured at the surface.

Adjusting the trajectory of the second wellbore based on the EM data measured at the surface.

Estimating the distance $\lambda$ between the first surface location and the first wellbore; applying a forward modeling algorithm utilizing the estimated distance $\lambda$ between the first surface location and the first wellbore to yield a simulated magnetic field at the first surface location; comparing the simulated magnetic field to the measured magnetic field and determining a difference between the simulated magnetic field and the first magnetic field; if the difference between the simulated magnetic field and the first magnetic field is greater than a predetermined threshold, revising estimated distance $\lambda$ and repeating the step of applying and comparing; and if the difference between the simulated magnetic field and the first magnetic field is less than or equal to a predetermined threshold, then determining a distance between the first EM sensor and the first wellbore.

Measuring a magnetic field $H_m$ generated from a first wellbore with a surface positioned sensor; estimating the distance $\lambda$ between a particular surface location of the sensor and the first wellbore; applying a forward modeling algorithm utilizing the estimated distance $\lambda$ between the particular surface location of the sensor and the first well to yield a simulated magnetic field H1 at the particular sensor location; comparing the simulated magnetic field H1 to the measured magnetic field $H_m$ and determining a difference $\Delta$ between the simulated results and the measured results; if the difference $\Delta$ between the simulated results and the measured results is greater than a predetermined threshold, revising estimated distance $\lambda$ and repeating the step of utilizing and comparing; and if the difference $\Delta$ between the simulated results and the measured results is less than or equal to a predetermined threshold, then determine a distance R1 between the surface sensor and the first wellbore.

Estimating comprises estimating a Y distance between the wellbore and the surface positioned sensor and estimating the Z distance between the wellbore and the surface positioned sensor.

A modeling algorithm is selected from the algorithm group consisting of Integral Equation, Method of Moments, Finite Difference, Finite Element and Semi-Analytical Formulation.

Revising comprises selecting a change in the initial estimate $\Delta\lambda$, and utilizing the initial estimate and the change as a revised estimate.

$\Delta\lambda$ is obtained using the Guass-Newton algorithm.

Repeating one or more method a second wellbore, and thereafter, determining the relative distance and angle between the first wellbore and the second wellbore.

It should be understood by those skilled in the art that the illustrative embodiments described herein are not intended to be construed in a limiting sense. Various modifications and combinations of the illustrative embodiments as well as other embodiments will be apparent to persons skilled in the art upon reference to this disclosure. It is, therefore, intended that the appended claims encompass any such modifications or embodiments.

The invention claimed is:

1. An electromagnetic (EM) wellbore surface ranging system comprising:
   a first wellbore extending from a surface of a formation, the first wellbore having a first elongated conductive member disposed therein, wherein the first elongated conductive member is configured to generate a first magnetic field directly in response to current injection;
   an EM sensor disposed on the surface of the formation and configured to sense the first magnetic field;
   a current injection system disposed on the surface of the formation in direct electrical contact with the elongated conductive member and configured to inject current to the first elongated conductive member; and
   a location system configured to identify a surface location of the EM sensor.

2. The system of claim 1, further comprising:
   a second wellbore extending from the surface of a formation, the second wellbore having a second elongated conductive member disposed therein, wherein the second elongated conductive member is configured to generate a second magnetic field directly in response to current injection, and wherein the EM sensor is configured to sense both the first magnetic field and the second magnetic field; and
   a current injection system disposed on the surface of the formation in direct electrical contact with the second conductive member and configured to inject current to the second elongated conductive member.

3. The system of claim 2, wherein the current injection system in direct electrical contact with the first conductive member is the same current injection system in direct electrical contact with the second conductive member.

4. The system of claim 2, further comprising a controller configured to receive data from the EM sensor associated with the first magnetic field and data associated with the second magnetic field and determine a spatial relationship between the first wellbore and the second wellbore from the data.

5. The system of claim 2, wherein the second conductive member is a drillstring, and wherein the current injection system in direct electrical contact with the first conductive member is a first current injection system deployed at the surface and the current injection system in direct electrical contact with the second conductive member is a second current injection system carried by the drillstring.

6. The system of claim 1, wherein the location system comprises a GPS.

7. The system of claim 1, wherein the EM sensor comprises a magnetometer or a plurality of spaced apart magnetometers.

8. The system of claim 1, wherein the EM sensor comprises a magnetic gradiometer.

9. The system of claim 1, further comprising a wellhead installation, wherein the current injection system is in electrical contact with the wellhead installation and the wellhead installation is in electrical contact with the first conductive member.

10. The system of claim 1, wherein the current injection system is in direct electrical contact with the first conductive member at a location along a length of the first conductive member and within the first wellbore.

11. The system of claim 1, wherein the conductive members are selected from the group consisting of wellbore casing and a drillstring.

12. The system of claim 1, wherein the EM sensor and location system are integrated into a single, hand-held unit.

13. The system of claim 1, further comprising a plurality of spaced apart EM sensors arranged in an array at the surface, wherein the location system is further configured to identify a surface location of each of the plurality of EM sensors.

14. An EM surface ranging method comprising:
   deploying a first elongated conductive member in a first wellbore extending from a surface of a formation, wherein the first elongated conductive member is configured to generate a first magnetic field directly in response to current injection;
   injecting, with a first current injection system disposed on the surface of the formation, a current directly into the first elongated conductive member to generate the first magnetic field about the first elongated conductive member;
   positioning a first EM sensor at a first surface location at the surface of a formation;
   utilizing a location system to identify the first surface location and generate first surface location data; and
   measuring the first magnetic field at the first surface location with the first EM sensor to generate first magnetic field data.

15. The method of claim 14, further comprising:
   deploying a second elongated conductive member in a second wellbore, wherein the second elongated conductive member is configured to generate a second magnetic field directly in response to current injection;
   injecting, with a second current injection system disposed on the surface of the formation, a current directly into the second elongated conductive member to generate the second magnetic field about the second elongated conductive member; and
   measuring the second magnetic field at the surface of the formation with the first EM sensor to generate second magnetic field data.

16. The method of claim 15, further comprising:
   determining a relative spatial relationship between the first wellbore and the second wellbore based on the first magnetic field data and the second magnetic field data, wherein the spatial relationship is selected from the group consisting of a distance and an angle.

17. The method of claim 16, wherein the first elongated conductive member is a casing string and the second elongated conductive member is a drillstring, the method further comprising adjusting a trajectory of the second wellbore based on the first magnetic field data and the second magnetic field data.

18. The method of claim 15, further comprising:
beginning drilling of the second wellbore;
suspending drilling of the second wellbore;
measuring the second magnetic field at the surface of the formation with an EM sensor to generate second magnetic field data; and
thereafter, continuing to drill the second wellbore.

19. The method of claim 14, further comprising associating the first magnetic field data with the first surface location data.

20. The method of claim 14, further comprising:
positioning a second EM sensor adjacent the first EM sensor, but spaced apart therefrom; and
utilizing the second EM sensor to measure the first magnetic field, wherein the first magnetic field data comprises a magnetic gradient resulting from the measurements of the first magnetic field by the first EM sensor and the second EM sensor.

21. The method of claim 14, further comprising:
positioning the first EM sensor to a second surface location;
measuring the first magnetic field at the second surface location with the first EM sensor to generate second magnetic field data;
utilizing a location system to identify the second surface location and generate second surface location data; and
associating the first magnetic field data with the first surface location data and the second magnetic field data with the second surface location.

22. The method of claim 14, further comprising:
estimating a distance $\lambda$ between the first surface location and the first wellbore;
applying a forward modeling algorithm utilizing the estimated distance $\lambda$ between the first surface location and the first wellbore to yield a simulated magnetic field at the first surface location;
comparing the simulated magnetic field to the measured magnetic field and determining a difference between the simulated magnetic field and the first magnetic field;
if the difference between the simulated magnetic field and the first magnetic field is greater than a predetermined threshold, revising estimated distance $\lambda$ and repeating the step of applying and comparing; and
if the difference between the simulated magnetic field and the first magnetic field is less than or equal to a predetermined threshold, then determining a distance between the first EM sensor and the first wellbore.

* * * * *